(12) United States Patent
Mese et al.

(10) Patent No.: US 11,637,990 B1
(45) Date of Patent: Apr. 25, 2023

(54) APPARATUS, METHODS, AND PROGRAM PRODUCTS FOR MANAGING VIDEO FILTERS

(71) Applicant: Lenovo (Singapore) Pte. Ltd., New Tech Park (SG)

(72) Inventors: John C. Mese, Cary, NC (US); Arnold Weksler, Raleigh, NC (US); Mark Delaney, Cary, NC (US); Nathan Peterson, Oxford, NC (US); Russell Speight VanBlon, Raleigh, NC (US)

(73) Assignee: Lenovo (Singapore) Pte. Ltd, New Tech Park (SG)

( * ) Notice: Subject to any disclaimer, the term of this patent is extended or adjusted under 35 U.S.C. 154(b) by 0 days.

(21) Appl. No.: 17/497,053

(22) Filed: Oct. 8, 2021

(51) Int. Cl.
*H04N 7/15* (2006.01)
*H04L 12/18* (2006.01)
*H04L 65/403* (2022.01)
*H04L 65/1076* (2022.01)

(52) U.S. Cl.
CPC .......... *H04N 7/15* (2013.01); *H04L 12/1822* (2013.01); *H04L 65/1076* (2013.01); *H04L 65/403* (2013.01)

(58) Field of Classification Search
CPC ............ H04N 7/15; H04L 29/06; H04L 12/18
USPC .............................................. 348/14.01–14.16
See application file for complete search history.

(56) References Cited

U.S. PATENT DOCUMENTS

| | | | |
|---|---|---|---|
| 2008/0030590 A1* | 2/2008 | Ciudad | H04N 7/147 348/211.12 |
| 2016/0261825 A1* | 9/2016 | Chougle | G10L 25/57 |
| 2017/0374194 A1* | 12/2017 | Sales | H04W 4/02 |
| 2019/0066279 A1* | 2/2019 | Monkarsh | H04L 67/306 |
| 2020/0134298 A1* | 4/2020 | Zavesky | A63F 13/655 |
| 2020/0341625 A1* | 10/2020 | Roedel | H04N 7/147 |
| 2022/0277435 A1* | 9/2022 | Muthusamy | G06T 5/002 |

* cited by examiner

*Primary Examiner* — Melur Ramakrishnaiah
(74) *Attorney, Agent, or Firm* — Kunzler Bean & Adamson

(57) ABSTRACT

Apparatus, methods, and computer program products for managing video filters are disclosed. One apparatus includes a processor and a memory that stores code executable by the processor. The code is executable by the processor to detect whether a video feed for a user participating in a video conference on a video conferencing platform includes a video filter and, in response to detecting that the video feed includes a video filter, determine whether the video filter is socially suitable for an environment of the video conference. Methods and computer program products that include and/or perform the operations and/or functions of the apparatus are also disclosed.

20 Claims, 18 Drawing Sheets

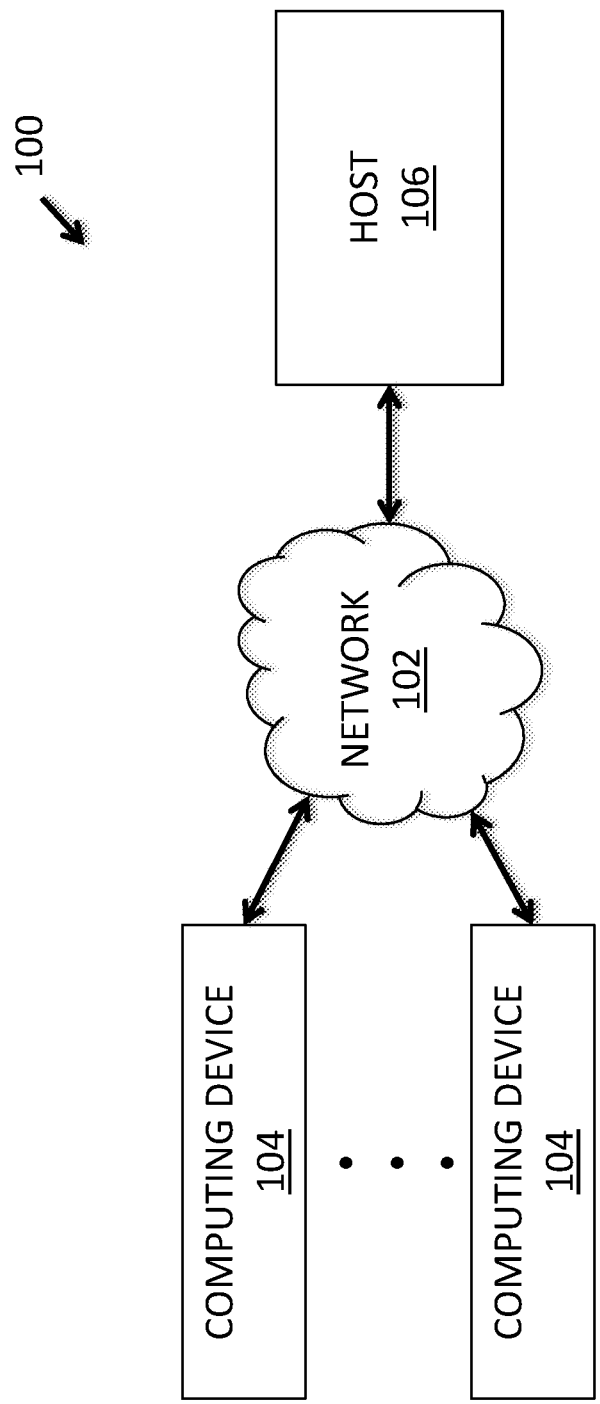

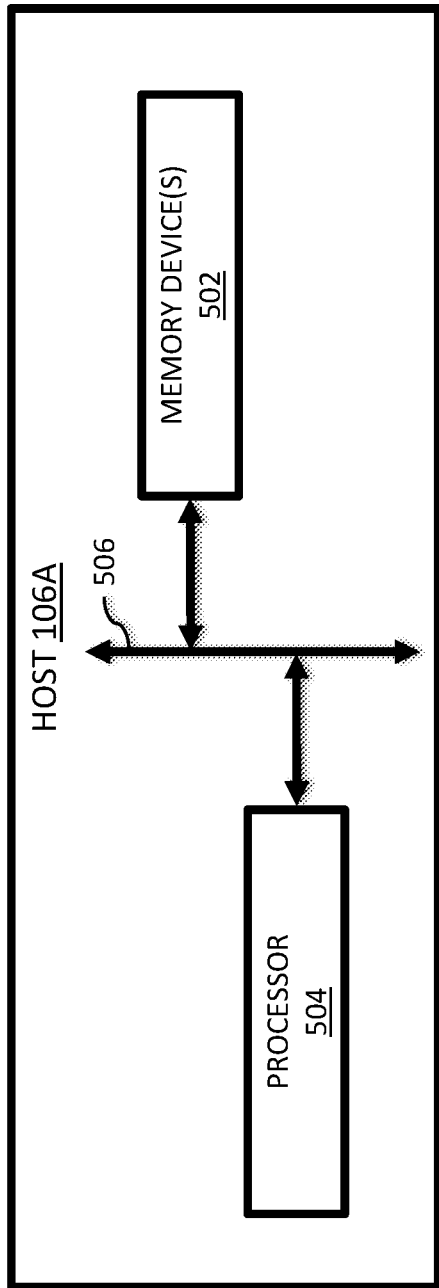
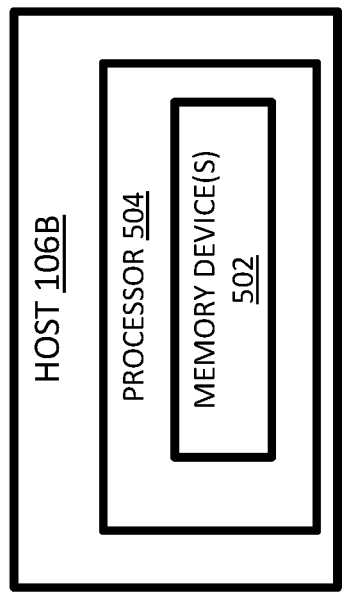

APPARATUS, METHODS, AND PROGRAM PRODUCTS FOR MANAGING VIDEO FILTERS

FIELD

The subject matter disclosed herein relates to video conferencing and more particularly relates to apparatus, methods, and program products that can manage video filters.

DESCRIPTION OF THE RELATED ART

Modern virtual work and school environments have increased the use of cameras and/or video conferencing in meetings. Concurrent with this trend is the mixed usage of personal and professional video conferencing on the same device. Using the same device for personal and professional video conferencing can cause at least some socially appropriateness issues to occur depending on the environment of a particular video conference. That is, a particular video filter that is socially appropriate and/or suitable for video conferences in personal video conference environments/meetings may be socially inappropriate and/or socially unsuitable for video conferences in professional video conference environments/meetings, as evidenced by the famous (or infamous) example of the lawyer who joined a meeting with the judge and opposing counsel with a cat filter on the lawyer's video feed.

At least some contemporary solutions for ensuring that a video feed and/or video filter is socially appropriate/suitable and/or is not socially inappropriate/unsuitable for a video conference may include, not using a camera during a meeting, turning OFF incoming video feeds for one or more participants, and/or manually checking one's own video feed to determine if the video feed and/or video filter is appropriate/inappropriate for a particular video conference environment/meeting. These solutions can be effective; however, it is usually the user's responsibility to ensure that one or more of these solutions is/are actually implemented, which may not always occur. In other words, contemporary solutions do not include apparatus, methods, and program products that can manage video filters and/or video feeds/content to ensure that a video filter and/or video feed/content is socially appropriate and/or is not socially inappropriate for a particular video conference environment and/or meeting.

BRIEF SUMMARY

Apparatus for managing video filters are disclosed. One apparatus includes a processor and a memory that stores code executable by the processor. The code is executable by the processor to detect whether a video feed for a user participating in a video conference on a video conferencing platform includes a video filter and, in response to detecting that the video feed includes a video filter, determine whether the video filter is socially suitable for an environment of the video conference.

Also disclosed are methods for managing video filters. One method includes detecting, by a processor, whether a video feed for a user participating in a video conference on a video conferencing platform includes a video filter and, in response to detecting that the video feed includes a video filter, determining whether the video filter is socially suitable for an environment of the video conference.

Computer program products including a computer-readable storage medium including code embodied therewith are further disclosed herein. The code is executable by a processor and causes the processor to detect whether a video feed for a user participating in a video conference on a video conferencing platform includes a video filter and, in response to detecting that the video feed includes a video filter, determine whether the video filter is socially suitable for an environment of the video conference.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1 is a schematic block diagram of one embodiment of a computing system that can manage video filters and/or video feeds;

FIGS. 5A and 5B are schematic block diagrams of various embodiments of a host included in the computing system (and/or computing device) of FIG. 1;

DETAILED DESCRIPTION

Figure 2A:
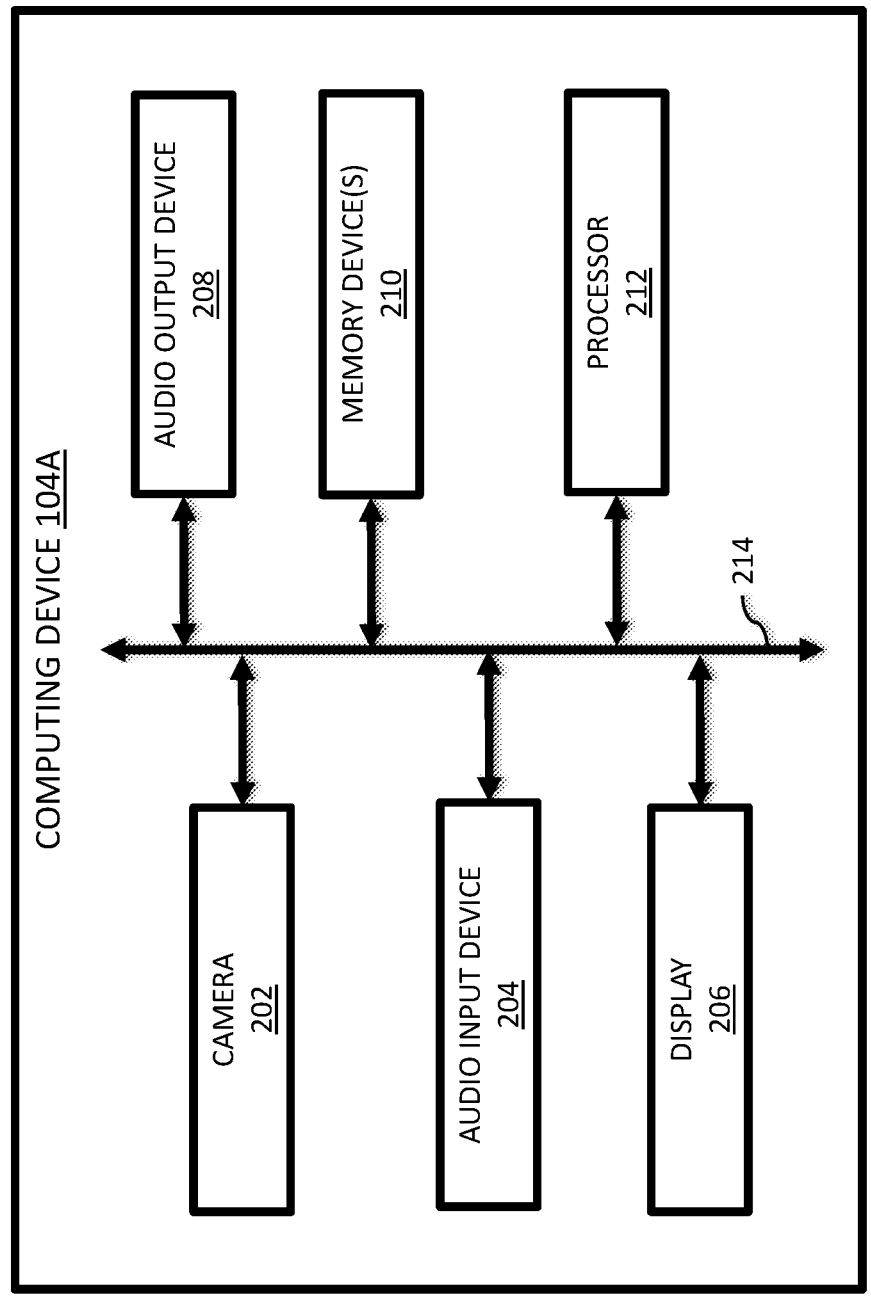
FIGS. 2A and 2B are schematic block diagrams of various embodiments of a computing device (source/target computing device) included in the computing system of FIG. 1.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together and may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms, "a," "an," and "the," also refer to one or more unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatus, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

With reference to the drawings, FIG. 1 is a schematic block diagram of one embodiment of a computing system 100 (and/or computing network 100) that can manage video filters and/or video feeds. At least in the illustrated embodiment, the computing system 100 includes, among other components, a network 102 connecting a set of two or more computing devices 104 (also simply referred individually, in various groups, or collectively as computing device(s) 104) and a host computing system 106 and/or host computing device 106 (or simply, host 106) to one another.

The network 102 may include any suitable wired and/or wireless network 102 (e.g., public and/or private computer networks in any number and/or configuration (e.g., the Internet, an intranet, a cloud network, etc.)) that is known or developed in the future that enables the set of computing devices 104 and the server 106 to be coupled to and/or in communication with one another and/or to share resources. In various embodiments, the network 102 can comprise the Internet, a cloud network (IAN), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of communicating (e.g., video conferencing) with one another that are possible and contemplated herein.

A computing device 104 may include any suitable computing system and/or computing device capable of accessing and/or communicating with one another and with the host 106 via the network 102. Examples of a computing device 104 include, but are not limited to, a laptop computer, a desktop computer, a personal digital assistant (PDA), a tablet computer, a smart phone, a cellular telephone, a smart television (e.g., televisions connected to the Internet), a wearable, an Internet of Things (IoT) device, a game console, a vehicle on-board computer, a streaming device, a smart device, and a digital assistant, etc., among other computing devices that are possible and contemplated herein.

With reference to FIG. 2A, FIG. 2A is a block diagram of one embodiment of a computing device 104. At least in the illustrated embodiment, the computing device 104A includes, among other components, a camera 202, an audio input device 204, a display 206, an audio output device 208, one or more memory devices 210, and a processor 212 coupled to and/or in communication with one another via a bus 214 (e.g., a wired and/or wireless bus).

A camera 202 may include any suitable device that is known or developed in the future capable of capturing and transmitting images, video feeds, and/or video streams. In various embodiments, the camera 202 includes at least one video camera and/at least one microphone.

An audio input device 204 may include any suitable device that is known or developed in the future capable of capturing and transmitting audio/sound, audio feeds, and/or audio streams. In various embodiments, the audio input device 204 includes at least one microphone.

A display 206 may include any suitable device that is known or developed in the future capable of displaying images, video feeds, and/or video streams. In various embodiments, the display 206 may include an internal display or an external display.

An audio output device 208 may include any suitable device that is known or developed in the future capable of receiving and providing audio/sound, audio feeds, and/or audio streams. In various embodiments, the audio output device 204 includes a speaker, and set of headphones, a set of earbuds, etc., among other suitable audio output devices that are possible and contemplated herein.

A set of memory devices 210 may include any suitable quantity of memory devices 210. Further, a memory device 210 may include any suitable type of device and/or system that is known or developed in the future that can store computer-useable and/or computer-readable code. In various embodiments, a memory device 210 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 212).

A memory device 210, in some embodiments, includes volatile computer storage media. For example, a memory device 210 may include random access memory (RAM), including dynamic RAM (DRAM), synchronous dynamic RAM (SDRAM), and/or static RAM (SRAM). In other embodiments, a memory device 210 includes non-volatile computer storage media. For example, a memory device 210 may include a hard disk drive, a flash memory, and/or any other suitable non-volatile computer storage device that is known or developed in the future. In various embodiments, a memory device 210 includes both volatile and non-volatile computer storage media.

Figure 3A:
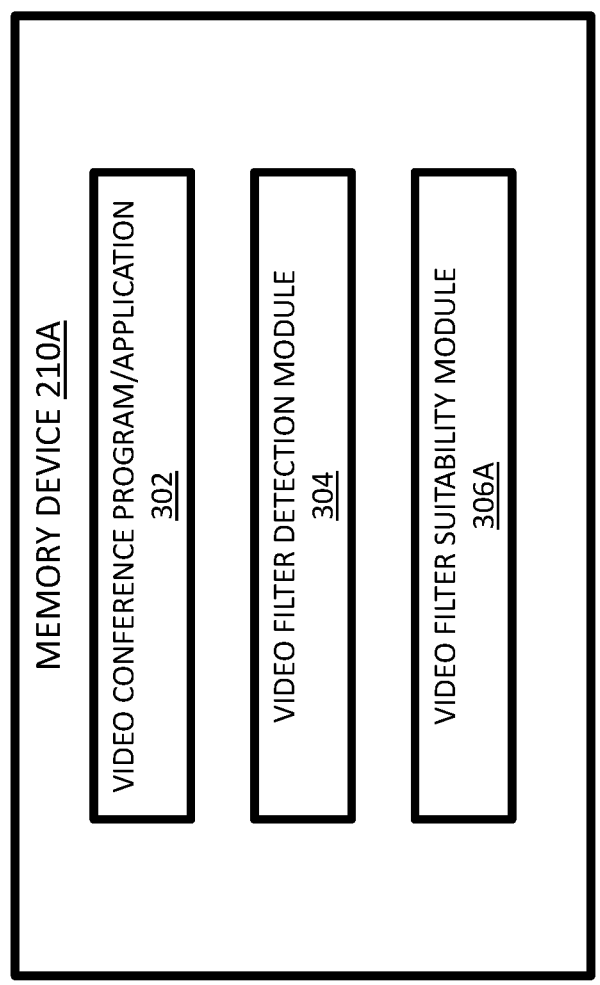
FIGS. 3A and 3B are schematic block diagrams of various embodiments of a memory device included in the computing devices of FIGS. 2A and 2B.

With reference now to FIG. 3A, FIG. 3A is a schematic block diagram of one embodiment of a memory device 210A. At least in the illustrated embodiment, the memory device 210A includes, among other components, a video conferencing program and/or application 302, a video filter detection module 304, and a video filter suitability module 306A (or simply, suitability module 306A) that are each configured to operate/function in conjunction with one another when executed by the processor 212 to manage video filters during a video conference.

A video conferencing program/application 302 may include any suitable commercial and/or private video conferencing program and/or application that is known or developed in the future. Examples of a video conferencing program/application 302 include, but are not limited to, Microsoft Teams®, Zoom®, Google Meet®, Cisco Webex®, GoToMeeting®, Skype®, etc., among other video conferencing programs/applications that are possible and contemplated herein.

In various embodiments, a video conferencing program/application 302 is configured to utilize the camera 202 and the audio input device 204 to capture one or more images and one or more audios/sounds, respectively, and generate a video feed and/or video stream that includes the captured image(s) and audio(s)/sound(s) (e.g., of a user). The video conferencing program/application 302 is further configured to transmit the video feed and/or video stream to one or more other computing devices 104 and/or to the host 106. A computing device 104 that generates a video feed and/or video stream and transmits the video feed and/or video stream to one or more other computing devices 104 and/or to the host 106 can be referred to herein as a source computing device.

In additional or alternative embodiments, the video conferencing program/application 302 is further configured to receive video feeds and/or video streams from one or more other computing devices 104 and/or the host 106. The video conferencing program/application 302 is also configured to utilize the display 206 and the audio output device 208 to display the image(s) and play the audio(s)/sound(s), respectively, in the received video feed and/or video stream (e.g., to a user). A computing device 104 that receives a video feed and/or video stream from one or more other computing devices 104 and/or from the host 106 and displays the image(s) and the audio(s)/sound(s) in the video feed and/or video stream can be referred to herein as a target computing device. Accordingly, a computing device 104 can be both a source computing device or a target computing device depending on whether the computing device 104 is generating/transmitting video feeds and/or video streams or is receiving video feeds and/or video streams.

In some embodiments, the video feed and/or video stream generated by a computing device 104 (e.g., a source computing device) or received by a computing device 104 (e.g., a target computing device) can include a video filter. The video filter can be included as a portion of the video filter and/or can be a copy of a/the video filter included along with a video feed and/or video stream.

A video filter and/or a copy of a/the video filter can be any suitable video filter that is known or developed in the future. The video filter can be a visual video filter and/or an auditory video filter. Examples of a video filter include, but are not limited to, visual and/or auditory representations and/or masks of a real person, a fictional character, a characteristic and/or feature (e.g., bald/hairy, old/young, short/tall, clothing, exaggerated features, etc.), an animal, a bird, a fish, an insect, a creature, a background (e.g., artificial and/or real), a shape, an inanimate object (e.g., a car, a plane, a ship, a building, a food, the Sun/Moon, planet, glasses, etc.), and/or an animate object, etc. among other visual and/or auditory video filters and/or types of video filters that are possible and contemplated herein.

A video filter detection module 304 may include any suitable hardware and/or software that can detect a video filter and/or a copy of a video filter in a video feed and/or video stream. In various embodiments, the video filter detection module 304 is configured to monitor and/or search video feeds and/or video streams generated by a computing device 104 (e.g., a source computing device) prior to the video feeds and/or video streams being transmitted to another computing device 104 (e.g., a target computing device) and/or to the host 106 (e.g., a target computing device) to determine and/or detect whether the video feeds and/or video streams include a video filter. In additional or alternative embodiments, the video filter detection module 304 is configured to monitor and/or search video feeds and/or video streams that are received by a computing device 104 (e.g., a target computing device) from another computing device 104 (e.g., a source computing device) and/or from the host 106 (e.g., a source computing device) to determine and/or detect whether the received video feeds and/or video streams include a video filter.

In some embodiments, the video filter detection module 304 does nothing if the video feed/stream does not include a video filter. That is, the video filter detection module 304 continues monitoring/searching the video feed/stream for video filters.

In certain embodiments, the video filter detection module 304 is configured to notify and/or transmit a notification to a suitability module 306A in response to the video filter detection module 304 determining/detecting that a video feed and/or video stream generated by the computing device 104 includes a video filter. Here, the notification can identify that the video feed/stream includes a video filter and also identify which video filter is included in the video feed/stream.

In additional or alternative embodiments, the video filter detection module 304 is configured to notify and/or transmit a notification to a suitability module 306A in response to the video filter detection module 304 determining/detecting that a video feed and/or video stream received from another computing device 104 includes a video filter. Here, the notification can identify that the received video feed/stream includes a video filter and also identify which video filter is included in the received video feed/stream.

A suitability module 306A may include any suitable hardware and/or software that can receive notifications from a video filter detection module 304 indicating that a video feed and/or video stream includes a video filter. The suitability module 306A may further include any suitable hardware and/or software that can determine whether the video filter is socially suitable for a particular video conferencing environment.

In various embodiments, the suitability module 306A is configured to determine and/or identify the type and/or level of video conferencing environment for a current video conference, which can be any type of video conferencing environment. For example, the suitability module 306A can determine/identify whether the video conference is a personal video conference (e.g., a personal video conferencing environment), a professional video conference (e.g., a professional video conferencing environment), an informal video conference (e.g., an informal video conferencing environment), a neutral video conference (e.g., a neutral video conferencing environment), or a formal video conference (e.g., a formal video conferencing environment), etc., among other types and/or levels of a video conferencing environment for a video conference that are possible and contemplated herein.

The type and/or level of the video conferencing environment can be determined/identified using any suitable technique, characteristics, and/or metrics that can distinguish different types and/or levels of video conferences and/or video conferencing environments. In some embodiments, the type and/or level of video conferences and/or video conferencing environments can be determined/identified by the type of video conferencing platform. That is, different types of video conferencing platforms can be used for different types/levels of video conferences, which can create different corresponding types/levels of video conferencing environments.

In some embodiments, the suitability module 306A can determine/identify the type and/or level of video conferencing environment based on the type and/or manufacturer of a video conferencing platform. For example, the suitability module 306A can distinguish between video conferencing platforms that can used for professional and/or formal video conferences (e.g., a professional and/or formal video conferencing environment), video conferencing platforms that can used for neutral video conferences (e.g., a neutral video conferencing environment), and video conferencing platforms that can be used for personal and/or informal video conferences (e.g., a professional and/or informal video conferencing environment). For example, video conferencing platform X may be used for professional and/or formal video conferences and video conferencing platform Y may be used for personal and/or informal video conferences, among other examples of types/levels of video conferencing platforms and/or video conferencing environments that are possible can contemplated herein.

In additional or alternative embodiments, the suitability module 306A can determine/identify the type and/or level of video conferencing environment based on the type of user of one or more other computing devices 104 in a video conferencing environment. For example, the suitability module 306A can distinguish between professional and/or formal users (e.g., a professional and/or formal video conferencing environment), neutral users (e.g., a neutral video conferencing environment), and personal and/or informal users (e.g., a professional and/or informal video conferencing environment). For example, business users may define a professional and/or formal video conferencing environment, unknown entities and/or persons may define a neutral video conferencing environment, and friends and/or family may define a personal and/or informal video conferencing environment, among other examples of types/levels of users and/or video conferencing environments that are possible can contemplated herein.

In further embodiments, the suitability module 306A is configured to determine and/or identify the type and/or level of video filter for a current video filter. That is, the suitability module 306A can determine/identify whether the video filter is a personal video filter, a professional video filter, an informal video filter, a neutral video filter, or a formal video filter, etc., among other types and/or levels of a video filter that are possible and contemplated herein. For example, a video filter that includes a character and/or a character voice may be considered a personal/informal video filter and/or a neutral video filter and a video filter that includes a particular background or a blurred background may be considered a professional/formal video filter, among other non-limiting examples that are possible and contemplated herein.

In some embodiments, the suitability module 306A is configured to determine whether a video filter included in a video feed/stream is socially suitable and/or appropriate for a particular video conferencing environment based on the type and/or level of video conferencing environment for a current video conference and the type and/or level of a video filter included in a video feed/stream of the video conference. The suitability module 306A can determine/identify whether a video filter included in a video feed/stream is socially suitable and/or appropriate for a particular video conferencing environment using any suitable technique, characteristics, and/or metrics. That is, determining whether a video filter included in a video feed/stream is socially suitable/appropriate and/or socially unsuitable/inappropriate for a particular video conferencing environment can be based on any suitable corresponding factor(s), characteristic(s), and/or metric(s) between a particular video conferencing environment and/or a particular video filter.

In various embodiments, the suitability module 306A can determine/identify whether a video filter included in a video feed/stream is socially suitable/appropriate and/or socially unsuitable/inappropriate for a particular video conferencing environment by matching the type/level of the video filter and the type/level of the video conferencing environment. That is, the suitability module 306A is configured to compare the type/level of the video filter and the type level of the video conferencing environment to determine whether there is a match. In certain embodiments, the suitability module 306A can determine/identify that a video filter included in a video feed/stream is socially suitable/appropriate for a particular video conferencing environment in response to determining/identifying that the type/level of the video filter and the type/level of the video conferencing environment match. Alternatively, the suitability module 306A can determine/identify that a video filter included in a video feed/stream is socially unsuitable/inappropriate for a particular video conferencing environment in response to determining/identifying that the type/level of the video filter and the type/level of the video conferencing environment do not match and/or fail to match.

For example, a cat filter (e.g., a personal/informal level of video filter) may match (e.g., is socially suitable/appropriate) a video conference amongst family and/or friends (e.g., a personal/informal level of video conference and/or video conferencing environment), among other examples that are possible and contemplated herein. Alternatively, the same cat filter may not match (e.g., is socially unsuitable/inappropriate) a video conference with clients and/or colleagues (e.g., a professional/formal level of video conference and/or video conferencing environment), among other examples that are possible and contemplated herein.

In some embodiments, any and/or all video filters may be determined/identified as socially suitable/appropriate for a certain type/level of video conference and/or video conferencing environment. For example, the suitability module 306A may be configured to deem any and/or all video filters as socially suitable/appropriate for a personal/informal video conference and/or video conferencing environment among other examples that are possible and contemplated herein.

In additional or alternative embodiments, any and/or all video filters may be determined/identified as socially unsuitable/inappropriate for a certain type/level of video conference and/or video conferencing environment. For example, the suitability module 306A may be configured to deem any and/or all video filters as socially unsuitable/inappropriate for a professional/formal video conference and/or video conferencing environment among other examples that are possible and contemplated herein.

Figure 3B:
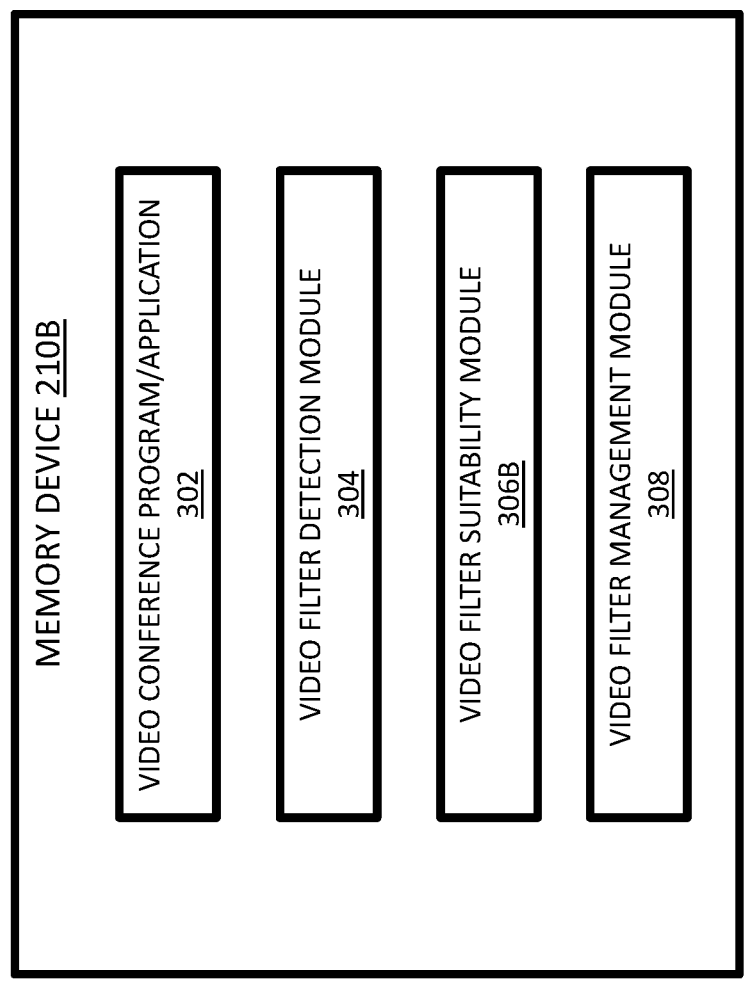

Referring now to FIG. 3B, FIG. 3B is a block diagram of another embodiment of a memory device 210B. The memory device 210B includes a video conference program/application 302, a video filter detection module 304, and a video conference suitability module 306B (or simply, suitability module 306B) similar to the video conference program/application 302, video filter detection module 304, and video conference suitability module 306A included in the memory device 210A discussed elsewhere herein. At least in the illustrated embodiment, the memory device 210B further includes, among other components, a video filter management module 308.

In various embodiments, the suitability module 306B is configured to function similar to the suitability module 306A discussed elsewhere herein. In further embodiments, the suitability module 306B is configured to notify and/or transmit a notification to the video filter management module 308 in response to determining whether a video filter included in a video feed/stream of a video conference is socially suitable/appropriate or socially unsuitable/inappropriate for a particular video conference and/or video conferencing environment. In various embodiments, the notice/notification identifies to the video conferencing module 308 whether a video filter included in a video feed/stream of a video conference is socially suitable/appropriate or socially unsuitable/inappropriate for a particular video conference and/or video conferencing environment.

A video filter management module 308 may include any suitable hardware and/or software that can receive notifications from a suitability module 306B indicating that a video feed and/or video stream includes a video filter. The video filter management module 308 may further include any suitable hardware and/or software that can manage a video filter included in a video feed/stream.

In various embodiments, the video filter management module 308 is configured to manage the video filters based on the match/non-match determined by the suitability module 306B. The video filter management module 308, in some embodiments, is configured to allow the video feed/stream to maintain the video filter in response to the type/level of the video filter matching the type/level of the video conference and/or video conferencing environment (e.g., the video filter is socially suitable/appropriate for the video conference and/or video conferencing environment).

In further embodiments, the video filter management module 308 is configured to disable, remove, and/or delete the video filter from the video feed/stream in response to the type/level of the video filter not matching or failing to match the type/level of the video conference and/or video conferencing environment (e.g., the video filter is socially unsuitable/inappropriate for the video conference and/or video conferencing environment). Here, the video filter management module 308 is configured to facilitate presenting the user(s) of the target computing device(s) 104 and/or the host 106 with a video feed/stream from a source computing device 104 that is free of the video filter.

For example, when located on a source computing device 104, the video filter management module 308 is configured to disable, remove, and/or delete the video filter from the video feed/stream from and transmit the video feed/stream void of the video filter to the target computing device(s) 104 and/or the host 106. In another non-limiting example, when located on a target computing device 104, the video filter management module 308 is configured to disable, remove, and/or delete the video filter from the feed/stream received from a source computing device 104 or a host 106 and present the video feed/stream void of the video filter to the user of the target computing device 104. In some embodiments, the video filter management module 308 is configured to notify the user of a source computing device 104 and/or a target computing device 104 that a video filter has been disabled, removed, and/or deleted from the video feed/stream.

In certain embodiments, the video filter management module 308 is configured to notify the user of a source computing device 104 that a video feed/stream generated on the source computing device 104 includes a video filter prior to the source computing device 104 transmitting the video feed/stream to one or more target computing devices 104 and/or to the host 106, which can also be considered a target device. Further, the video filter management module 308 can be configured to provide the user of the source computing device 104 a sufficient amount of time for the user to disable or modify the video filter prior to transmitting a video feed/stream to the other computing devices 104 and/or the host 106. Here, the user can be provided with an amount of time to double-check whether the user desires to include a video filter, regardless of the type/level of the video filter, the video conference, and/or the video conferencing environment.

Additionally, or alternatively, the video filter management module 308 is configured to provide the user of a source computing device 104 a preview of a video feed/stream that includes a video filter prior to the source computing device 104 transmitting the video feed/stream to one or more target computing devices 104 and/or to the host 106 in response to determining that the video filter is socially unsuitable/inappropriate for a video conference and/or video conferencing environment. Further, the video filter management module 308 can be configured to provide the user of the source computing device 104 a sufficient amount of time for the user to disable or modify the video filter prior to transmitting a video feed/stream to the other computing devices 104 and/or the host 106. Here, the user can be provided with an amount of time to double-check whether the user desires to include a video filter, regardless of the type/level of the video filter, the video conference, and/or the video conferencing environment.

In further additional or alternative embodiments, the video filter management module 308 is configured to monitor the background of a user and detect that the background of a video feed/stream has changed prior to the source computing device 104 transmitting the video feed/stream to one or more target computing devices 104 and/or to the host 106. Further, the video filter management module 308 can be configured to add a video filter to the modified background or delete the modified background from the video feed/stream prior to transmitting a video feed/stream to the other computing devices 104 and/or the host 106. The video filter management module 308 can perform these operations on an on-going and/or continuous basis during a video conference.

In certain embodiments (e.g., on a source computing device 104), the video filter management module 308 can implement one or more default video filters for generated video feeds/streams that can be set by a user. For example, a user can set a default professional and/or formal video filter, a default neutral video filter, and/or a default personal and/or informal video filter for a professional and/or formal video conference and/or video conferencing environment, a default neutral video conference and/or video conferencing environment, and/or a default personal and/or informal video conference and/or video conferencing environment, among other default settings that are possible and contemplated herein.

In additional of alternative embodiments (e.g., on a target computing device 104), the video filter management module 308 can implement one or more default video filters for received video feeds/streams that can be set by a user. For example, a user can set a default professional and/or formal video filter, a default neutral video filter, and/or a default personal and/or informal video filter for a professional and/or formal video conference and/or video conferencing environment, a default neutral video conference and/or video conferencing environment, and/or a default personal and/or informal video conference and/or video conferencing environment, among other default settings that are possible and contemplated herein. In another non-limiting example, the user can set a default setting that disables any and all video filters and/or backgrounds in received video feeds/streams.

In certain embodiments when a computing device 104 receives a video feed/stream that includes a base feed and a copy of a video filter (e.g., a target computing device 104), the video filter management module 308 can present to the user of the target computing device 104 the option of accepting or rejecting the video filter in the received video feed/stream. The video filter management module 308 can present the video feed/stream with the video filter to the user in response to the user selecting to accept the video filter. Alternatively, the video filter management module 308 can disable and/or remove the copy of the video filter in the video feed/stream and present the video feed/stream void of the video filter to the user in response to the user selecting to reject the video filter.

In some embodiments, the video filter management module 308 is configured to manage the video filters based on one or more policies. The implemented policy and/or policies may include any suitable quantity and/or criterion/criteria for managing video filters.

In some embodiments, a policy may include the video filter management module 308 removing any and/or all video filters from a particular type of video feed/stream, during predetermined hours of the day (e.g., working hours), and/or for predetermined video conference platforms. For example, the video filter management module 308 may remove/delete any and all video filters from a professional and/or formal video conference and/or video conferencing environment.

In other embodiments, a policy may include the video filter management module 308 including any and/or all video filters for a particular type of video feed/stream, during predetermined hours of the day (e.g., non-working hours), and/or for predetermined video conference platforms. For example, the video filter management module 308 may include any and all video filters for a personal and/or informal video conference and/or video conferencing environment.

In certain embodiments, a policy can include the video filter management module 308 using a particular video filter for any and/or all video feeds/streams. For example, the video filter management module 308 may replace any and all video filters in a received video feed/stream with a predetermined and/or pre-selected video filter.

Referring back to FIG. 2A, a processor 212 may include any suitable non-volatile/persistent hardware and/or software configured to perform and/or facilitate performing functions and/or operations for managing video filters. In various embodiments, the processor 212 includes hardware and/or software for executing instructions in one or more modules and/or applications that can perform and/or facilitate performing functions and/or operations for managing video filters. The modules and/or applications executed by the processor 212 for managing video filters can be stored on and executed from a memory device 210 and/or from the processor 212.

Figure 4A:
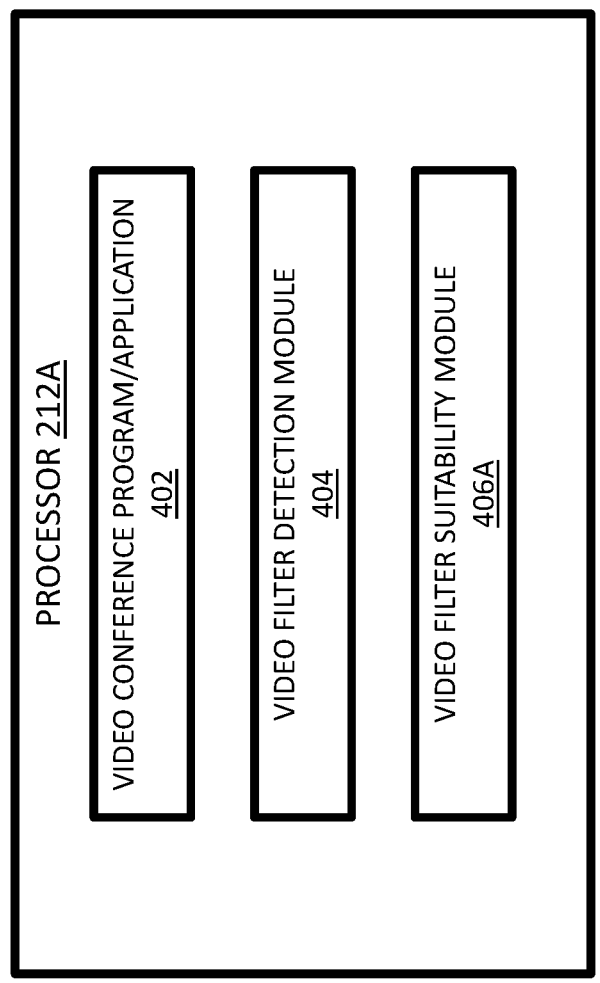
FIGS. 4A and 4B are schematic block diagrams of various embodiments of a processor included in the computing devices of FIGS. 2A and 2B.

With reference to FIG. 4A, FIG. 4A is a schematic block diagram of one embodiment of a processor 212A. At least in the illustrated embodiment, the processor 212A includes, among other components, a video conference program/application 402, a video filter detection module 404, and a video filter suitability module 406B similar to the video conference program/application 302, video filter detection module 304, and video filter suitability module 306B in the memory device 210A discussed with reference with FIG. 3A.

Figure 4B:
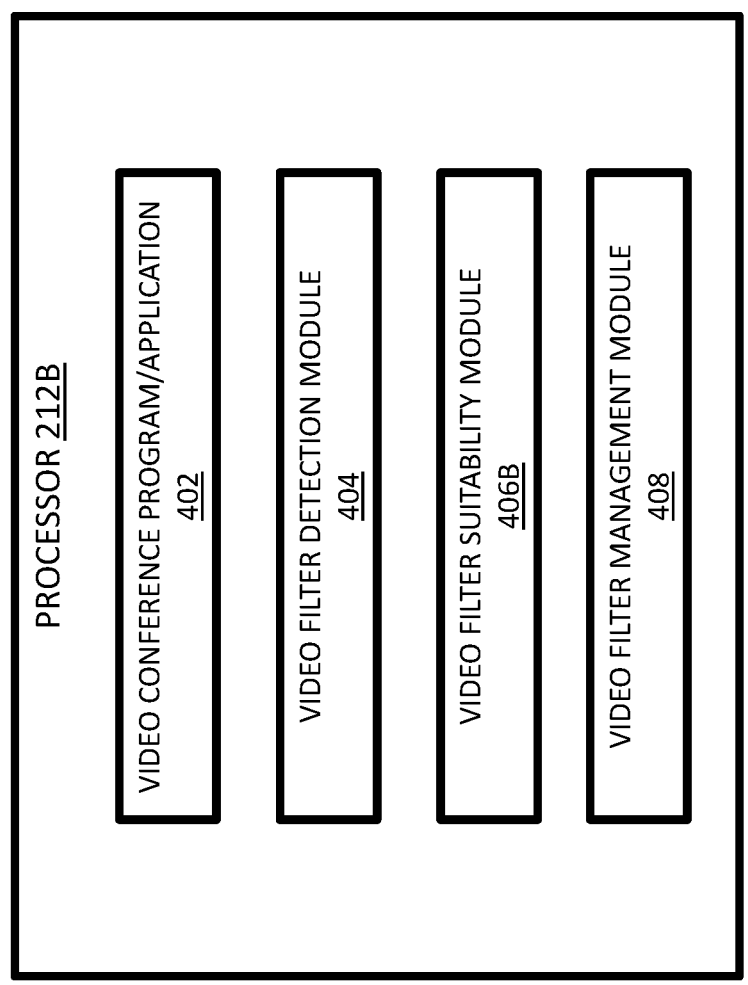

Referring to FIG. 4B, FIG. 4B is a schematic block diagram of another embodiment of a processor 212B. At least in the illustrated embodiment, the processor 212A includes, among other components, a video conference program/application 402, a video filter detection module 404, a video filter suitability module 406B, and a video filter management module 408 similar to the video conference program/application 302, video filter detection module 304, video filter suitability module 306B, and video filter management module 308 in the memory device 210B discussed with reference with FIG. 3B.

Figure 2B:
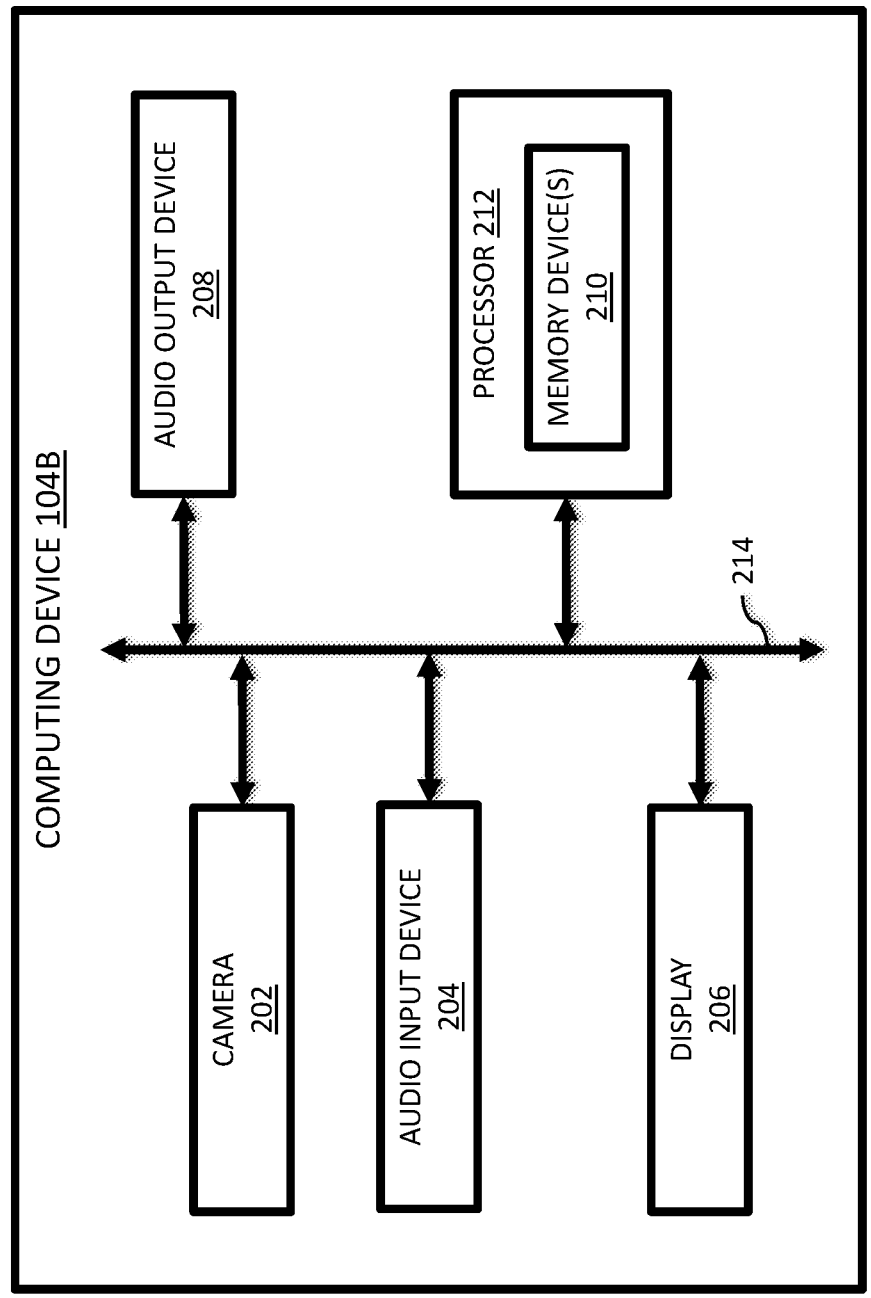

Turning now to FIG. 2B, FIG. 2B is a block diagram of another embodiment of a computing device 104B. The computing device 104B includes, among other components, a camera 202, an audio input device 204, a display 206, and an audio output device 208 similar to the computing device 104A discussed elsewhere herein. Alternative to the computing device 104A, the computing device 104B includes a processor 212 that includes the memory device 210 as opposed to the memory device 210 of the computing device 104A being a different device than and/or independent of the processor 212.

With reference again to FIG. 1, a host 106 may include any suitable computer hardware and/or software that can provide video conference host operations. In various embodiments, a host computing device 106 can include one or more processors, computer-readable memory, and/or one or more interfaces, among other features and/or hardware. A host computing device 106 can further include any suitable software component or module, or computing device(s) that is/are capable of hosting and/or serving a software application or services, including distributed, enterprise, and/or cloud-based software applications, data, and services. For instance, a host computing device 106 can be configured to host, serve, or otherwise manage video conferences and video filters, or applications interfacing, coordinating with, or dependent on or used by other services, including video conference applications and software tools for managing video filters. In some instances, a host 106 can be implemented as some combination of devices that can comprise a common computing system and/or device, server, server pool, or cloud computing environment and share computing resources, including shared memory, processors, and interfaces.

Referring to FIG. 5A, FIG. 5A is a block diagram of one embodiment of a host 106A. At least in the illustrated embodiment, the host 106A includes, among other components, a set of one or more memory devices 502 and a processor 504 coupled to and/or in communication with one another via a bus 506 (e.g., a wired and/or wireless bus).

A set of memory devices 502 may include any suitable quantity of memory devices 502. Further, a memory device 502 may include any suitable type of device and/or system that is known or developed in the future that can store computer-useable and/or computer-readable code. In various embodiments, a memory device 502 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (e.g., processor 504).

A memory device 502, in some embodiments, includes volatile computer storage media. For example, a memory device 502 may include RAM, including DRAM, SDRAM, and/or SRAM. In other embodiments, a memory device 502 includes non-volatile computer storage media. For example, a memory device 502 may include a hard disk drive, a flash memory, and/or any other suitable non-volatile computer storage device that is known or developed in the future. In various embodiments, a memory device 502 includes both volatile and non-volatile computer storage media.

Figure 6A:
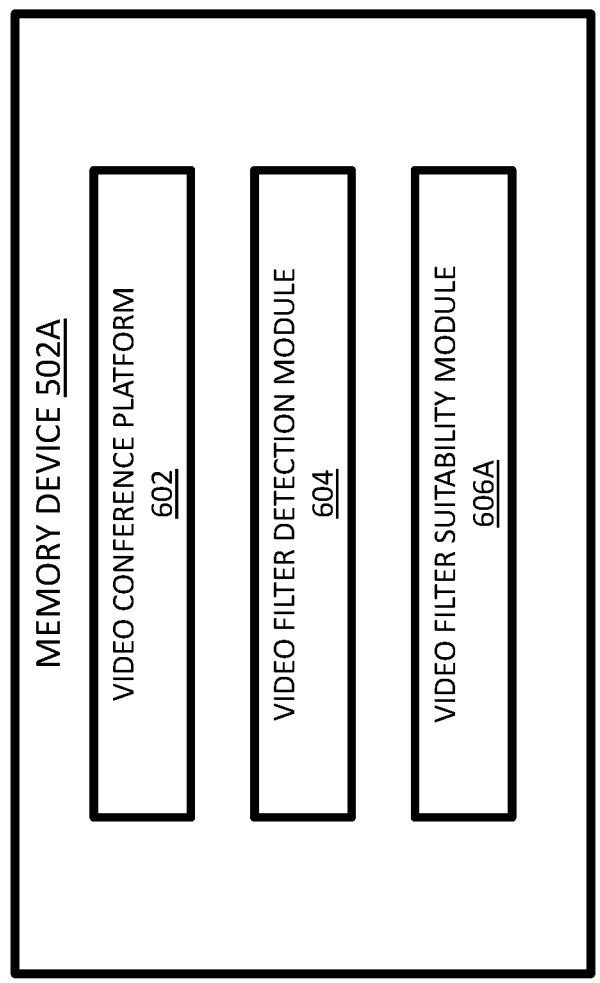
FIGS. 6A and 6B are schematic block diagrams of various embodiments of a memory device included in the hosts of FIGS. 5A and 5B.

With reference now to FIG. 6A, FIG. 6A is a schematic block diagram of one embodiment of a memory device 502A. At least in the illustrated embodiment, the memory device 502A includes, among other components, a video conferencing platform 602, a video filter detection module 604, and a video filter suitability module 606A (or simply, suitability module 606A) that are each configured to operate/function in conjunction with one another when executed by the processor 504 to manage video filters during a video conference.

A video conferencing platform 602 may include any suitable commercial and/or private video conferencing program and/or application that is known or developed in the future. In various embodiments, a video conferencing platform 602 is configured to transmit video feeds and/or video streams generated by a source computing device 104 to one or more target computing devices 104.

In some embodiments, the video feed and/or video stream generated by a computing device 104 (e.g., a source computing device) or received by a computing device 104 (e.g., a target computing device) can include a video filter. The video filter can be included as a portion of the video filter and/or can be a copy of a/the video filter included along with a video feed and/or video stream.

A video filter detection module 604 may include any suitable hardware and/or software that can detect a video filter and/or a copy of a video filter in a video feed and/or video stream. In various embodiments, the video filter detection module 604 is configured to monitor and/or search video feeds and/or video streams generated by a computing device 104 (e.g., a source computing device) prior to the video feeds and/or video streams being transmitted to another computing device 104 (e.g., a target computing device) to determine and/or detect whether the video feeds and/or video streams include a video filter.

In some embodiments, the video filter detection module 604 does nothing if the video feed/stream does not include a video filter. That is, the video filter detection module 604 continues monitoring/searching the video feeds/streams from the computing devices 104 for video filters.

In certain embodiments, the video filter detection module 604 is configured to notify and/or transmit a notification to a suitability module 606A in response to the video filter detection module 604 determining/detecting that a video feed and/or video stream generated by a computing device 104 includes a video filter. Here, the notification can identify that the video feed/stream includes a video filter and also identify which video filter is included in the video feed/stream.

A suitability module 606A may include any suitable hardware and/or software that can receive notifications from a video filter detection module 604 indicating that a video feed and/or video stream includes a video filter. The suitability module 606A may further include any suitable hardware and/or software that can determine whether the video filter is socially suitable for a particular video conferencing environment.

In various embodiments, the suitability module 606A is configured to determine and/or identify the type and/or level of video conferencing environment for a current video conference, which can be any type of video conferencing environment. For example, the suitability module 606A can determine/identify whether the video conference is a personal video conference (e.g., a personal video conferencing environment), a professional video conference (e.g., a professional video conferencing environment), an informal video conference (e.g., an informal video conferencing environment), a neutral video conference (e.g., a neutral video conferencing environment), or a formal video conference (e.g., a formal video conferencing environment), etc., among other types and/or levels of a video conferencing environment for a video conference that are possible and contemplated herein.

The type and/or level of the video conferencing environment can be determined/identified using any suitable technique, characteristics, and/or metrics that can distinguish different types and/or levels of video conferences and/or video conferencing environments. In some embodiments, the type and/or level of video conferences and/or video conferencing environments can be determined/identified by the type of video conferencing platform. That is, different types of video conferencing platforms can be used for different types/levels of video conferences, which can create different corresponding types/levels of video conferencing environments.

In additional or alternative embodiments, the suitability module 606A can determine/identify the type and/or level of video conferencing environment based on the type of user of one or more other computing devices 104 in a video conferencing environment. For example, the suitability module 606A can distinguish between professional and/or formal users (e.g., a professional and/or formal video conferencing environment), neutral users (e.g., a neutral video conferencing environment), and personal and/or informal users (e.g., a professional and/or informal video conferencing environment). For example, business users may define a professional and/or formal video conferencing environment, unknown entities and/or persons may define a neutral video conferencing environment, and friends and/or family may define a personal and/or informal video conferencing environment, among other examples of types/levels of users and/or video conferencing environments that are possible can contemplated herein.

In further embodiments, the suitability module 606A is configured to determine and/or identify the type and/or level of video filter for a current video filter. That is, the suitability module 606A can determine/identify whether the video filter is a personal video filter, a professional video filter, an informal video filter, a neutral video filter, or a formal video filter, etc., among other types and/or levels of a video filter that are possible and contemplated herein. For example, a video filter that includes a character and/or a character voice may be considered a personal/informal video filter and/or a neutral video filter and a video filter that includes a particular background or a blurred background may be considered a professional/formal video filter, among other non-limiting examples that are possible and contemplated herein.

In some embodiments, the suitability module 606A is configured to determine whether a video filter included in a video feed/stream is socially suitable and/or appropriate for a particular video conferencing environment based on the type and/or level of video conferencing environment for a current video conference and the type and/or level of a video filter included in a video feed/stream of the video conference. The suitability module 606A can determine/identify whether a video filter included in a video feed/stream is socially suitable and/or appropriate for a particular video conferencing environment using any suitable technique, characteristics, and/or metrics. That is, determining whether a video filter included in a video feed/stream is socially suitable/appropriate and/or socially unsuitable/inappropriate for a particular video conferencing environment can be based on any suitable corresponding factor(s), characteristic(s), and/or metric(s) between a particular video conferencing environment and/or a particular video filter.

In various embodiments, the suitability module 606A can determine/identify whether a video filter included in a video feed/stream is socially suitable/appropriate and/or socially unsuitable/inappropriate for a particular video conferencing environment by matching the type/level of the video filter and the type/level of the video conferencing environment. That is, the suitability module 606A is configured to compare the type/level of the video filter and the type level of the video conferencing environment to determine whether there is a match. In certain embodiments, the suitability module 606A can determine/identify that a video filter included in a video feed/stream is socially suitable/appropriate for a particular video conferencing environment in response to determining/identifying that the type/level of the video filter and the type/level of the video conferencing environment match. Alternatively, the suitability module 606A can determine/identify that a video filter included in a video feed/stream is socially unsuitable/inappropriate for a particular video conferencing environment in response to determining/identifying that the type/level of the video filter and the type/level of the video conferencing environment do not match and/or fail to match.

For example, a cat filter (e.g., a personal/informal level of video filter) may match (e.g., is socially suitable/appropriate) a video conference amongst family and/or friends (e.g., a personal/informal level of video conference and/or video conferencing environment), among other examples that are possible and contemplated herein. Alternatively, the same cat filter may not match (e.g., is socially unsuitable/inappropriate) a video conference with clients and/or colleagues (e.g., a professional/formal level of video conference and/or video conferencing environment), among other examples that are possible and contemplated herein.

In some embodiments, any and/or all video filters may be determined/identified as socially suitable/appropriate for a certain type/level of video conference and/or video conferencing environment. For example, the suitability module 306A may be configured to deem any and/or all video filters as socially suitable/appropriate for a personal/informal video conference and/or video conferencing environment among other examples that are possible and contemplated herein.

In additional or alternative embodiments, any and/or all video filters may be determined/identified as socially unsuitable/inappropriate for a certain type/level of video conference and/or video conferencing environment. For example, the suitability module 306A may be configured to deem any and/or all video filters as socially unsuitable/inappropriate for a professional/formal video conference and/or video conferencing environment among other examples that are possible and contemplated herein.

Figure 6B:
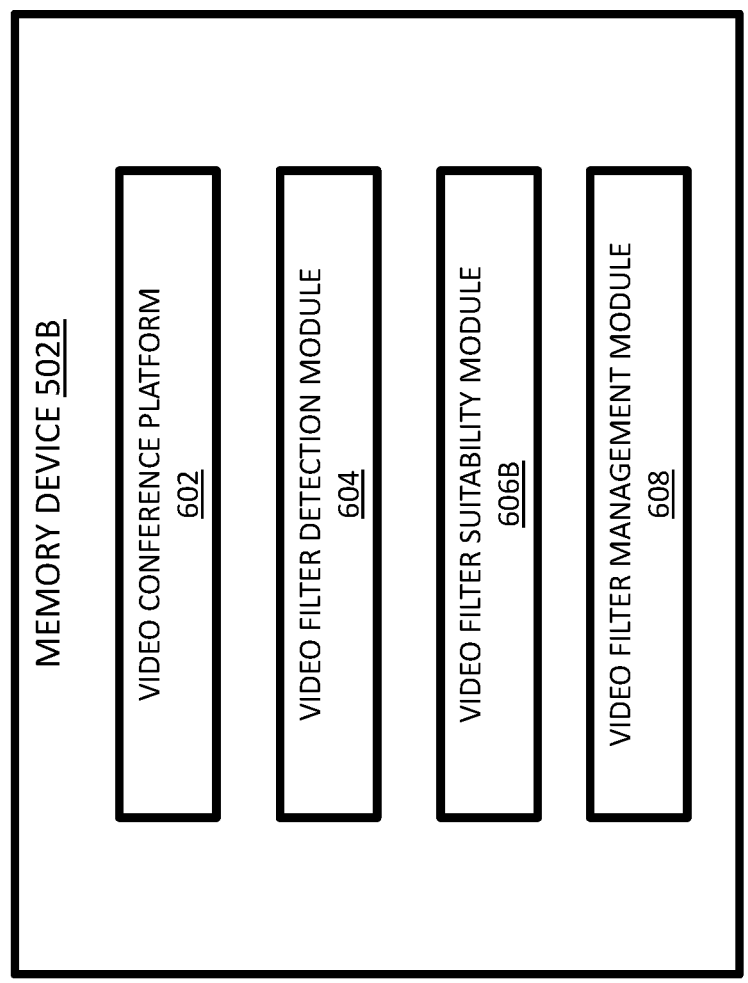

Referring now to FIG. 6B, FIG. 6B is a block diagram of another embodiment of a memory device 502B. The memory device 502B includes a video conference platform 602, a video filter detection module 604, and a video conference suitability module 606B (or simply, suitability module 606B) similar to the video conference platform 602, video filter detection module 604, and video conference suitability module 606A included in the memory device 502A discussed elsewhere herein. At least in the illustrated embodiment, the memory device 602B further includes, among other components, a video filter management module 608.

In various embodiments, the suitability module 606B is configured to function similar to the suitability module 606A discussed elsewhere herein. In further embodiments, the suitability module 606B is configured to notify and/or transmit a notification to the video filter management module 608 in response to determining whether a video filter included in a video feed/stream of a video conference is socially suitable/appropriate or socially unsuitable/inappropriate for a particular video conference and/or video conferencing environment. In various embodiments, the notice/notification identifies to the video conferencing module 608 whether a video filter included in a video feed/stream of a video conference is socially suitable/appropriate or socially unsuitable/inappropriate for a particular video conference and/or video conferencing environment.

A video filter management module 608 may include any suitable hardware and/or software that can receive notifications from a suitability module 606B indicating that a video feed and/or video stream includes a video filter. The video filter management module 608 may further include any suitable hardware and/or software that can manage a video filter included in video feeds/streams.

In various embodiments, the video filter management module 608 is configured to manage the video filters based on the match/non-match determined by the suitability module 606B. The video filter management module 608, in some embodiments, is configured to allow the video feed/stream to maintain the video filter in response to the type/level of the video filter matching the type/level of the video conference and/or video conferencing environment (e.g., the video filter is socially suitable/appropriate for the video conference and/or video conferencing environment).

In further embodiments, the video filter management module 608 is configured to disable, remove, and/or delete the video filter from the video feed/stream in response to the type/level of the video filter not matching or failing to match the type/level of the video conference and/or video conferencing environment (e.g., the video filter is socially unsuitable/inappropriate for the video conference and/or video conferencing environment). Here, the video filter management module 308 is configured to facilitate presenting the user(s) of the target computing device(s) 104 with a video feed/stream from a source computing device 104 that is free of the video filter.

In certain embodiments, the video filter management module 608 is configured to notify the user of a source computing device 104 that a video feed/stream generated on the source computing device 104 includes a video filter prior to the host 106 transmitting the video feed/stream to one or more target computing devices 104. Further, the video filter management module 608 can be configured to provide the user of the source computing device 104 a sufficient amount of time for the user to disable or modify the video filter prior to transmitting a video feed/stream to the other computing devices 104 from the host 106. Here, the user can be provided with an amount of time to double-check whether the user desires to include a video filter, regardless of the type/level of the video filter, the video conference, and/or the video conferencing environment.

Additionally, or alternatively, the video filter management module 608 is configured to provide the user of a source computing device 104 a preview of a video feed/stream that includes a video filter prior to the host 106 transmitting the video feed/stream to one or more target computing devices 104 from the host 106 in response to determining that the video filter is socially unsuitable/inappropriate for a video conference and/or video conferencing environment. Further, the video filter management module 608 can be configured to provide the user of the source computing device 104 a sufficient amount of time for the user to disable or modify the video filter prior to transmitting a video feed/stream to the other computing devices 104 from the host 106. Here, the user can be provided with an amount of time to double-check whether the user desires to include a video filter, regardless of the type/level of the video filter, the video conference, and/or the video conferencing environment.

In further additional or alternative embodiments, the video filter management module 608 is configured to monitor the background of a user and detect that the background of a video feed/stream has changed prior to the host 106 transmitting the video feed/stream to one or more target computing devices 104. Further, the video filter management module 608 can be configured to add a video filter to the modified background or delete the modified background from the video feed/stream prior to transmitting a video feed/stream to the other computing devices 104 from the host 106. The video filter management module 608 can perform these operations on an on-going and/or continuous basis during a video conference.

In certain embodiments, the video filter management module 608 can implement one or more default video filters for generated video feeds/streams that can be set by a user. For example, a user can set a default professional and/or formal video filter, a default neutral video filter, and/or a default personal and/or informal video filter for a professional and/or formal video conference and/or video conferencing environment, a default neutral video conference and/or video conferencing environment, and/or a default personal and/or informal video conference and/or video conferencing environment, among other default settings that are possible and contemplated herein.

In additional of alternative embodiments, the video filter management module 608 can implement one or more default video filters for received video feeds/streams that can be set by a user. For example, a user can set a default professional and/or formal video filter, a default neutral video filter, and/or a default personal and/or informal video filter for a professional and/or formal video conference and/or video conferencing environment, a default neutral video conference and/or video conferencing environment, and/or a default personal and/or informal video conference and/or video conferencing environment, among other default settings that are possible and contemplated herein. In another non-limiting example, the user can set a default setting that disables any and all video filters and/or backgrounds in received video feeds/streams.

In certain embodiments, the video filter management module 608 can present to the user of the target computing device 104 the option of accepting or rejecting a video filter in a video feed/stream. The video filter management module 608 can present the video feed/stream with the video filter to the target computing device 104 in response to a user selecting to accept the video filter. Alternatively, the video filter management module 608 can disable and/or remove the copy of the video filter in a video feed/stream and transmit the video feed/stream void of the video filter to the target computing device 104 in response to the user selecting to reject the video filter.

In some embodiments, the video filter management module 608 is configured to manage the video filters based on one or more policies. The implemented policy and/or policies may include any suitable quantity and/or criterion/criteria for managing video filters.

In some embodiments, a policy may include the video filter management module 608 removing any and/or all video filters from a particular type of video feed/stream, during predetermined hours of the day (e.g., working hours), and/or for predetermined video conference platforms. For example, the video filter management module 308 may remove/delete any and all video filters from a professional and/or formal video conference and/or video conferencing environment.

In other embodiments, a policy may include the video filter management module 608 including any and/or all video filters for a particular type of video feed/stream, during predetermined hours of the day (e.g., non-working hours), and/or for predetermined video conference platforms. For example, the video filter management module 308 may include any and all video filters for a personal and/or informal video conference and/or video conferencing environment.

In certain embodiments, a policy can include the video filter management module 608 using a particular video filter for any and/or all video feeds/streams. For example, the video filter management module 608 may replace any and all video filters in a received video feed/stream with a predetermined and/or pre-selected video filter.

Referring back to FIG. 5A, a processor 504 may include any suitable non-volatile/persistent hardware and/or software configured to perform and/or facilitate performing functions and/or operations for managing video filters. In various embodiments, the processor 504 includes hardware and/or software for executing instructions in one or more modules and/or applications that can perform and/or facilitate performing functions and/or operations for managing video filters. The modules and/or applications executed by the processor 504 for managing video filters can be stored on and executed from a memory device 502 and/or from the processor 504.

Figure 7A:
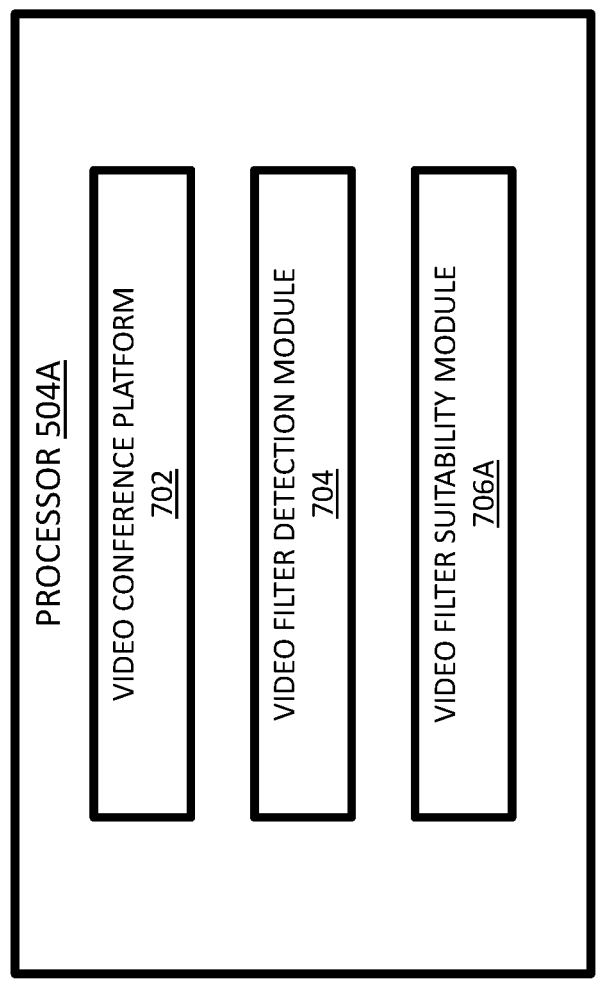
FIGS. 7A and 7B are schematic block diagrams of various embodiments of a processor included in the hosts of FIGS. 5A and 5B.

With reference to FIG. 7A, FIG. 7A is a schematic block diagram of one embodiment of a processor 504A. At least in the illustrated embodiment, the processor 504A includes, among other components, a video conference platform 702, a video filter detection module 704, and a video filter suitability module 706A similar to the video conference platform 602, video filter detection module 604, and video filter suitability module 606A in the memory device 502A discussed with reference to FIG. 6A.

Figure 7B:
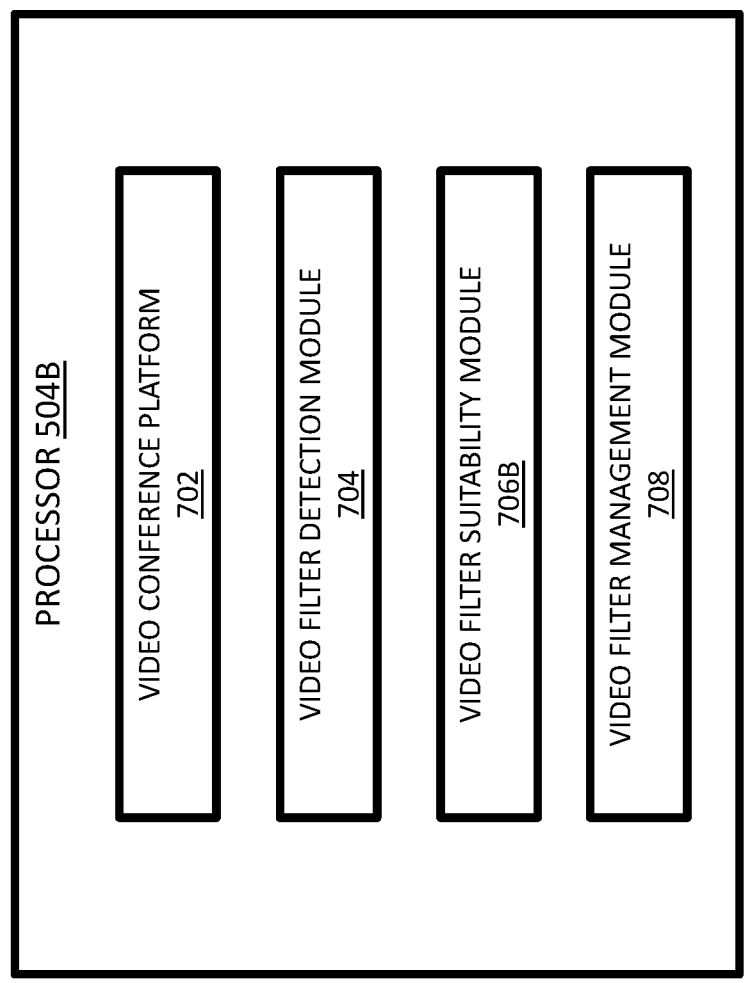

Referring to FIG. 7B, FIG. 7B is a schematic block diagram of another embodiment of a processor 504B. At least in the illustrated embodiment, the processor 504A includes, among other components, a video conference platform 702, a video filter detection module 704, a video filter suitability module 706B, and a video filter management module 708 similar to the video conference platform 602, video filter detection module 604, video filter suitability module 606B, and video filter management module 608 in the memory device 210B discussed with reference to FIG. 3B.

Turning now to FIG. 5B, FIG. 5B is a block diagram of another embodiment of a host 106B. The host 106B includes, among other components, a memory 502 and a processor 504. Alternative to the computing device 104A, the processor 502 in the host 106B includes the memory device 502 as opposed to the memory device 502 of the host 106A being a different device than and/or independent of the processor 504.

Figure 8:
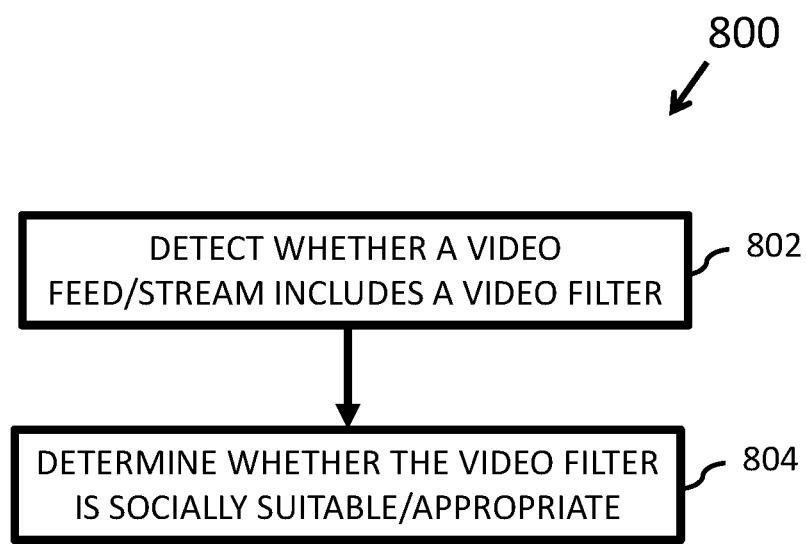
FIGS. 8 through 13 are flow diagrams of various embodiments of methods for managing video filters.

FIG. 8 is a schematic flow chart diagram illustrating one embodiment of a method 800 for managing video filters. At least in the illustrated embodiment, the method 800 begins by a processor (e.g., processor 212 or 504) detecting whether a video feed/stream includes a video filter (block 802). In response to detecting a video filter in the video feed/stream, the processor determines whether the video filter is socially suitable for a particular video conference and/or video conferencing environment (block 804).

Figure 9:
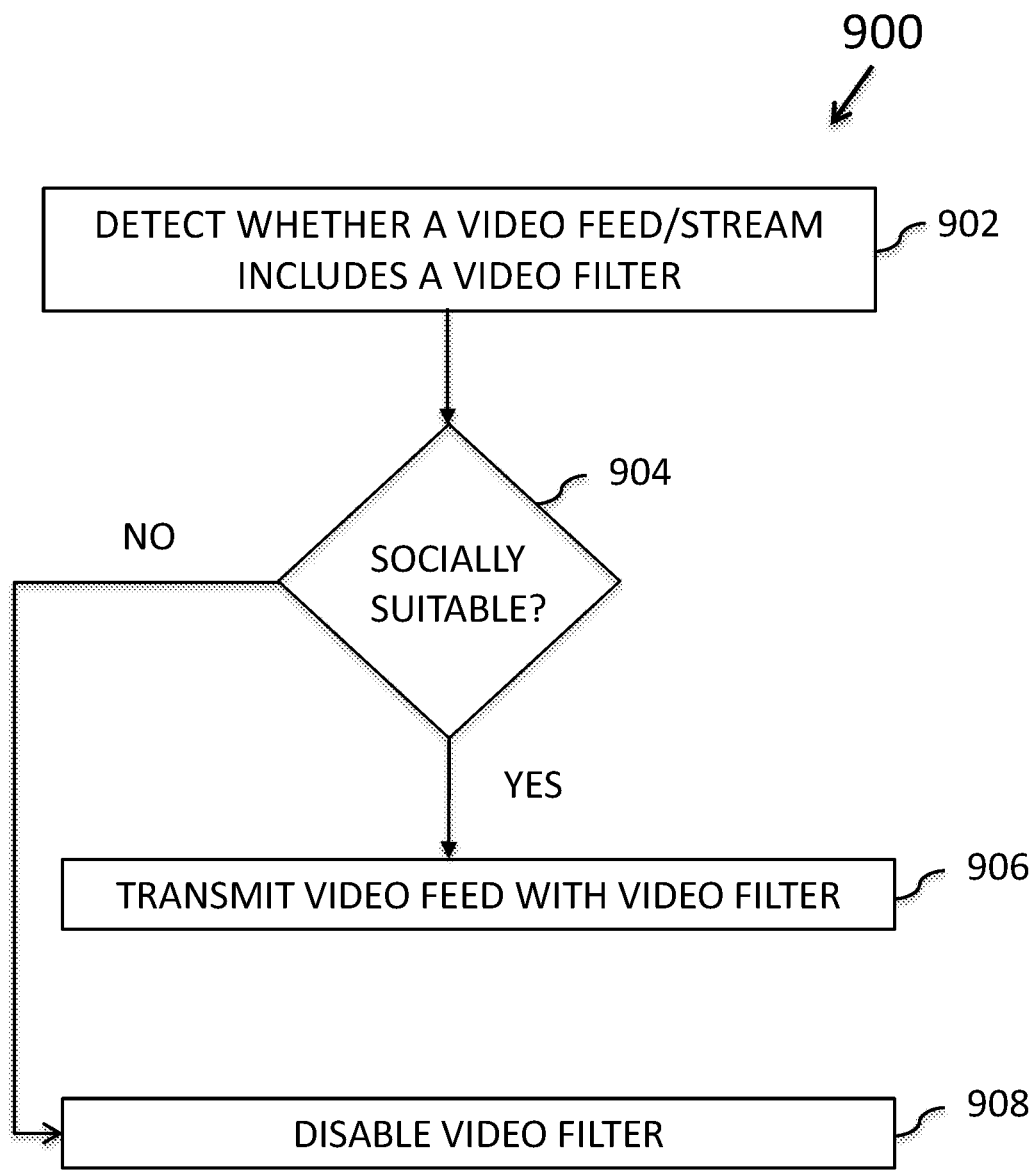

FIG. 9 is a schematic flow chart diagram illustrating another embodiment of a method 900 for managing video filters. At least in the illustrated embodiment, the method 900 begins by a processor (e.g., processor 212 or 504) detecting whether a video feed/stream includes a video filter (block 902). In response to detecting a video filter in the video feed/stream, the processor determines whether the video filter is socially suitable for a particular video conference and/or video conferencing environment (block 904).

In response to determining that the video filter is socially suitable for the particular video conference and/or video conferencing environment (e.g., a "YES" in block 904), the processor transmits the video feed/stream to a target computing device 104 with the video filter (block 906). In response to determining that the video filter is socially unsuitable for the particular video conference and/or video conferencing environment (e.g., a "NO" in block 904), the processor disables the video filter and transmits the video feed/stream to a target computing device 104 void of the video filter (block 908).

Figure 10:
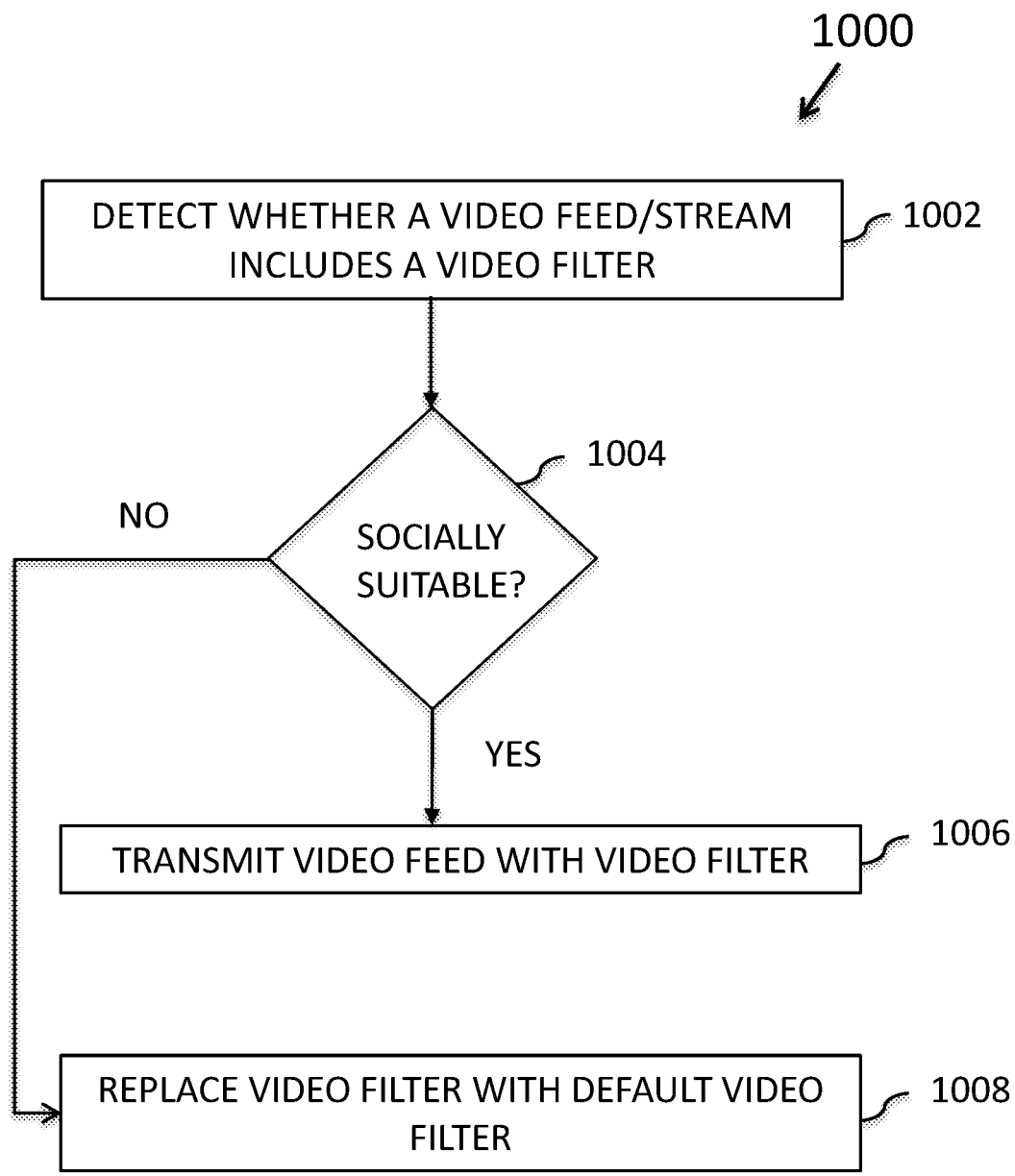

FIG. 10 is a schematic flow chart diagram illustrating another embodiment of a method 1000 for managing video filters. At least in the illustrated embodiment, the method 1000 begins by a processor (e.g., processor 212 or 504) detecting whether a video feed/stream includes a video filter (block 1002). In response to detecting a video filter in the video feed/stream, the processor determines whether the video filter is socially suitable for a particular video conference and/or video conferencing environment (block 1004).

In response to determining that the video filter is socially suitable for the particular video conference and/or video conferencing environment (e.g., a "YES" in block 1004), the processor transmits the video feed/stream to a target computing device 104 with the video filter (block 1006). In response to determining that the video filter is socially unsuitable for the particular video conference and/or video conferencing environment (e.g., a "NO" in block 1004), the processor replaces the video filter with a default video filter (block 1008).

Figure 11:
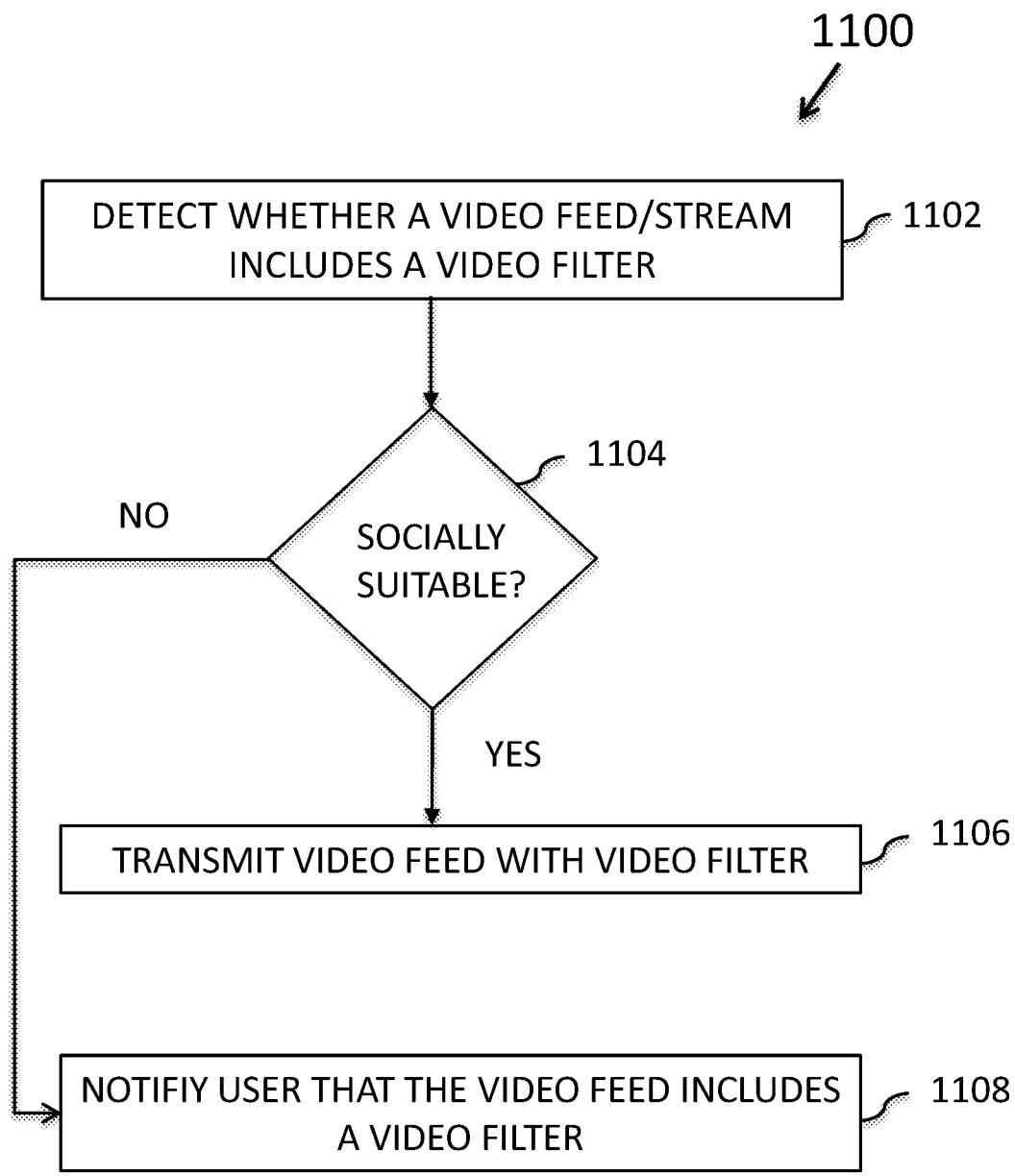

FIG. 11 is a schematic flow chart diagram illustrating another embodiment of a method 1100 for managing video filters. At least in the illustrated embodiment, the method 1100 begins by a processor (e.g., processor 212 or 504) detecting whether a video feed/stream includes a video filter (block 1102). In response to detecting a video filter in the video feed/stream, the processor determines whether the video filter is socially suitable for a particular video conference and/or video conferencing environment (block 1104).

In response to determining that the video filter is socially suitable for the particular video conference and/or video conferencing environment (e.g., a "YES" in block 1104), the processor transmits the video feed/stream to a target computing device 104 with the video filter (block 1106). In response to determining that the video filter is socially unsuitable for the particular video conference and/or video conferencing environment (e.g., a "NO" in block 1104), the processor notifies the user of a target computing device that the video filter is socially unsuitable for the particular video conference and/or video conferencing environment prior to transmitting the video feed/stream to a target computing device 104 (block 1108).

Figure 12:
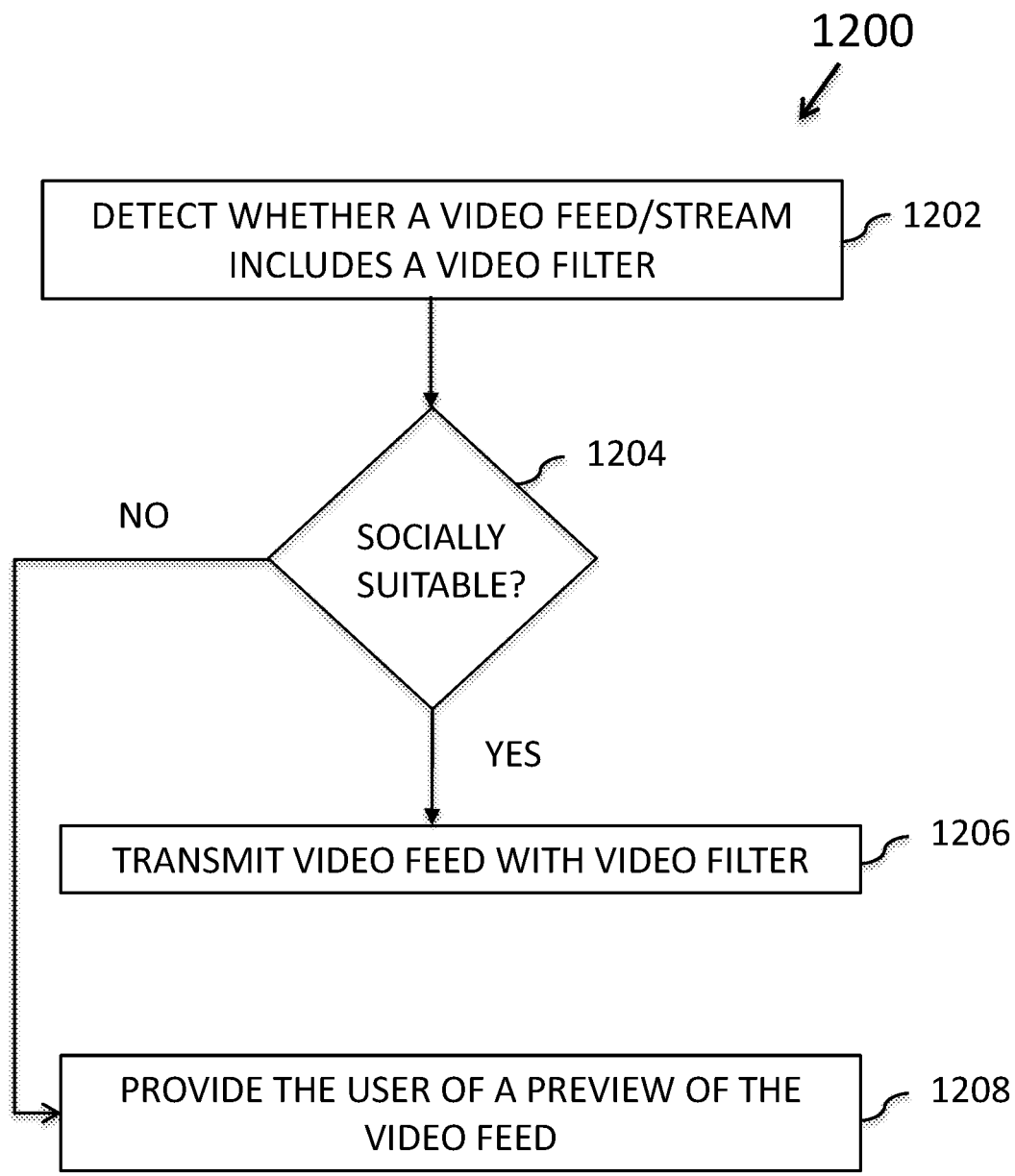

FIG. 12 is a schematic flow chart diagram illustrating another embodiment of a method 1200 for managing video filters. At least in the illustrated embodiment, the method 1200 begins by a processor (e.g., processor 212 or 504) detecting whether a video feed/stream includes a video filter (block 1202). In response to detecting a video filter in the video feed/stream, the processor determines whether the video filter is socially suitable for a particular video conference and/or video conferencing environment (block 1204).

In response to determining that the video filter is socially suitable for the particular video conference and/or video conferencing environment (e.g., a "YES" in block 1204), the processor transmits the video feed/stream to a target computing device 104 with the video filter (block 1206). In response to determining that the video filter is socially unsuitable for the particular video conference and/or video conferencing environment (e.g., a "NO" in block 1204), the processor provides a preview of the video filter to the user of a target computing device prior to transmitting the video feed/stream to a target computing device 104 (block 1208).

Figure 13:
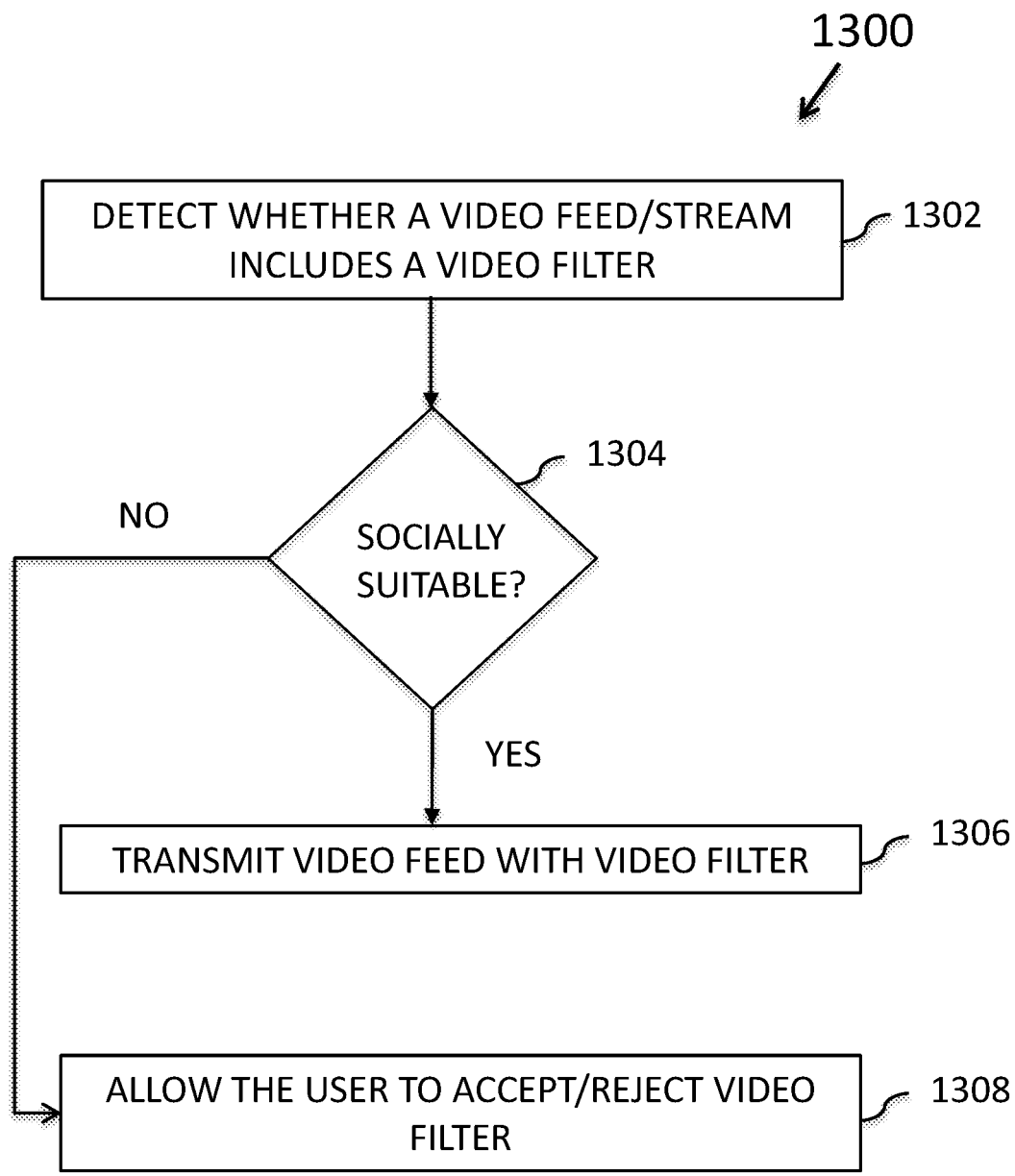

FIG. 13 is a schematic flow chart diagram illustrating another embodiment of a method 1300 for managing video filters. At least in the illustrated embodiment, the method 1300 begins by a processor (e.g., processor 212 or 504) detecting whether a video feed/stream includes a video filter (block 1302). In response to detecting a video filter in the video feed/stream, the processor determines whether the video filter is socially suitable for a particular video conference and/or video conferencing environment (block 1304).

In response to determining that the video filter is socially suitable for the particular video conference and/or video conferencing environment (e.g., a "YES" in block 1304), the processor transmits the video feed/stream to a target computing device 104 with the video filter (block 1306). In response to determining that the video filter is socially unsuitable for the particular video conference and/or video conferencing environment (e.g., a "NO" in block 1304), the processor provides the user of a target computing device with the option to accept/reject the video filter (block 1308).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory configured to store code executable by the processor to:
  detect whether a video feed for a first user participating in a video conference on a video conferencing platform includes a video filter mask, and
  in response to detecting that the video feed includes a video filter mask:
    determine a video filter type for the video filter mask,
    determine an environment type for an environment of the video conference, and
    determine whether the video filter mask is socially suitable for the environment of the video conference based on a comparison of the video filter type and the environment type.

2. The apparatus of claim 1, wherein:
the video feed is generated on a source device on the video conferencing platform participating in the video conference; and
the code is further executable by the processor to disable the video filter mask in response to determining that the video filter mask is not socially suitable for the video conference environment and prior to the source device transmitting the video feed to one or more target devices participating in the video conference on the video conferencing platform.

3. The apparatus of claim 1, wherein:
the video feed is generated on a source device participating in the video conference on the video conferencing platform; and
the code is further executable by the processor to replace the video filter mask with a default video filter mask in response to determining that the video filter mask is not socially suitable for the video conference environment and prior to the source device transmitting the video feed to one or more target devices participating in the video conference on the video conferencing platform.

4. The apparatus of claim 1, wherein:
the video feed is generated on a source device participating in the video conference on the video conferencing platform; and
the code is further executable by the processor to notify the first user that the video filter mask is not socially suitable for the video conference environment in response to determining that the video filter mask is not socially suitable for the video conference environment and prior to the source device transmitting the video feed to one or more target devices participating in the video conference on the video conferencing platform.

5. The apparatus of claim 1, wherein:
the video feed is generated on a source device participating in the video conference on the video conferencing platform; and
the code is further executable by the processor to provide the first user with a preview of the video feed prior to the source device transmitting the video feed to one or more target devices participating in the video conference on the video conferencing platform in response to determining that the video filter mask is socially unsuitable for the video conference environment.

6. The apparatus of claim 1, wherein:
the video feed is received by the processor from a source device participating in the video conference on the video conferencing platform;
the video feed comprises a base feed and a copy of the video filter mask; and
the code is further executable by the processor to at least one of:
  disable the copy of the video filter mask in response to determining that the video filter mask is not socially suitable for the video conference environment, and/or
  replace the copy of the video filter mask with a default video filter mask in response to determining that the video filter mask is not socially suitable for the video conference environment.

7. The apparatus of claim 1, wherein:
the video feed is received by the processor from a source device participating in the video conference on the video conferencing platform;
the video feed includes a base feed and a copy of the video filter mask; and
the code is further executable by the processor to prompt a second user of a target device participating in the video conference on the video conferencing platform to accept/reject the copy of the video filter mask.

8. A method, comprising:
detecting, by a processor, whether a video feed for a first user participating in a video conference on a video conferencing platform includes a video filter mask; and
in response to detecting that the video feed includes a video filter mask:
  determining a video filter type for the video filter mask,
  determine an environment type for an environment of the video conference, and
  determining whether the video filter mask is socially suitable for the environment of the video conference based on a comparison of the video filter type and the environment type.

9. The method of claim 8, wherein:
the video feed is generated on a source device participating in the video conference on the video conferencing platform; and
the method further comprises the processor disabling the video filter mask in response to determining that the video filter mask is not socially suitable for the video conference environment and prior to the source device transmitting the video feed to one or more target devices participating in the video conference on the video conferencing platform.

10. The method of claim 8, wherein:
the video feed is generated on a source device participating in the video conference on the video conferencing platform; and
the method further comprises the processor replacing the video filter mask with a default video filter mask in response to determining that the video filter mask is not socially suitable for the video conference environment and prior to the source device transmitting the video feed to one or more target devices participating in the video conference on the video conferencing platform.

11. The method of claim 8, wherein:
the video feed is generated on a source device participating in the video conference on the video conferencing platform; and
the method further comprises the processor notifying the first user that the video filter mask is not socially suitable for the video conference environment in response to determining that the video filter mask is not socially suitable for the video conference environment and prior to the source device transmitting the video feed to one or more target devices participating in the video conference on the video conferencing platform.

12. The method of claim 8, wherein:
the video feed is generated on a source device participating in the video conference on the video conferencing platform; and
the method further comprises the processor providing the first user with a preview of the video feed prior to the source device transmitting the video feed to one or more target devices participating in the video conference on the video conferencing platform in response to determining that the video filter mask is socially unsuitable for the video conference environment.

13. The method of claim 8, wherein:
the video feed is received by the processor from a source device participating in the video conference on the video conferencing platform;
the video feed comprises a base feed and a copy of the video filter mask; and
the method further comprises at least one of:
the processor disabling the copy of the video filter mask in response to determining that the video filter mask is not socially suitable for the video conference environment, and/or
the processor replacing the copy of the video filter mask with a default video filter in response to determining that the video filter mask is not socially suitable for the video conference environment.

14. The method of claim 8, wherein:
the video feed is received by the processor from a source device participating in the video conference on the video conferencing platform;
the video feed includes a base feed and a copy of the video filter mask; and
the method further comprises the processor prompting a second user of a target device participating in the video conference on the video conferencing platform to accept/reject the copy of the video filter mask.

15. A computer program product comprising a computer-readable storage medium including code embodied therewith, the code executable by a processor to cause the processor to:
detect whether a video feed for a first user participating in a video conference on a video conferencing platform includes a video filter mask; and
in response to detecting that the video feed includes a video filter mask:
determine a video filter type for the video filter mask,
determine an environment type for an environment of the video conference, and
determine whether the video filter mask is socially suitable for the environment of the video conference based on a comparison of the video filter type and the environment type.

16. The computer program product of claim 15, wherein:
the video feed is generated on a source device participating in the video conference on the video conferencing platform; and
the code further causes the processor to disable the video filter mask in response to determining that the video filter mask is not socially suitable for the video conference environment and prior to the source device transmitting the video feed to one or more target devices participating in the video conference on the video conferencing platform participating.

17. The computer program product of claim 15, wherein:
the video feed is generated on a source device participating in the video conference on the video conferencing platform; and
the code further causes the processor to replace the video filter mask with a default video filter mask in response to determining that the video filter mask is not socially suitable for the video conference environment and prior to the source device transmitting the video feed to one or more target devices participating in the video conference on the video conferencing platform.

18. The computer program product of claim 15, wherein:
the video feed is generated on a source device participating in the video conference on the video conferencing platform; and
the code further causes the processor to at least one of:
notify the first user that the video filter mask is not socially suitable for the video conference environment in response to determining that the video filter mask is not socially suitable for the video conference environment and prior to the source device transmitting the video feed to one or more target devices participating in the video conference on the video conferencing platform, and/or
provide the first user with a preview of the video feed prior to the source device transmitting the video feed to the one or more target devices participating in the video conference on the video conferencing platform in response to determining that the video filter mask is socially unsuitable for the video conference environment.

19. The computer program product of claim 15, wherein:
the video feed is received by the processor from a source device participating in the video conference on the video conferencing platform;
the video feed comprises a base feed and a copy of the video filter mask; and
the code further causes the processor to at least one of:
disable the copy of the video filter mask in response to determining that the video filter mask is not socially suitable for the video conference environment, and/or
replace the copy of the video filter mask with a default video filter mask in response to determining that the video filter mask is not socially suitable for the video conference environment.

20. The computer program product of claim 15, wherein:
the video feed is received by the processor from a source device participating in the video conference on the video conferencing platform;
the video feed includes a base feed and a copy of the video filter mask; and
the code further causes the processor to prompt a second user of a target device participating in the video conference on the video conferencing platform to accept/reject the copy of the video filter mask.

* * * * *